US007804296B2

(12) United States Patent
Flaum et al.

(10) Patent No.: US 7,804,296 B2
(45) Date of Patent: Sep. 28, 2010

(54) METHODS AND APPARATUS FOR MONITORING A PROPERTY OF A FORMATION FLUID

(75) Inventors: Charles Flaum, Beijing (CN); Robert L. Kleinberg, Cambridge, MA (US); Christian Straley, Ridgefield, CT (US); Robert Badry, Calgary (CA); Austin Boyd, Ridgefield, CT (US); Olivier Faivre, Paris (FR); Shawn Taylor, Edmonton (CA); Anthony R. H. Goodwin, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 12/020,788

(22) Filed: Jan. 28, 2008

(65) Prior Publication Data

US 2009/0091320 A1 Apr. 9, 2009

Related U.S. Application Data

(60) Provisional application No. 60/978,008, filed on Oct. 5, 2007.

(51) Int. Cl.
*G01V 3/00* (2006.01)

(52) U.S. Cl. ...................................... 324/303; 324/306

(58) Field of Classification Search ................ 324/303, 324/306

See application file for complete search history.

(56) References Cited

U.S. PATENT DOCUMENTS 3,213,357 A 10/1965 Brown et al.
6,346,813 B1 2/2002 Kleinberg
6,597,171 B2 7/2003 Hurlimann et al.
6,630,357 B2 10/2003 Mirotchnik et al.
6,755,246 B2 6/2004 Chen et al.
6,794,864 B2 9/2004 Mirotchnik et al.
6,825,657 B2 11/2004 Kleinberg et al.
6,891,369 B2 5/2005 Hurlimann et al.
7,091,719 B2 8/2006 Freedman
7,253,617 B1 * 8/2007 Chen et al. .................. 324/303
7,301,339 B1 * 11/2007 Cheng et al. ................ 324/303
2006/0243033 A1 11/2006 Freemark et al.
2006/0243047 A1 11/2006 Terabayashi et al.

FOREIGN PATENT DOCUMENTS

GB 2341685 3/2000
WO WO02079808 10/2002
WO WO2007048991 5/2007

* cited by examiner

*Primary Examiner*—Louis M Arana
(74) *Attorney, Agent, or Firm*—Dave R. Hofman

(57) ABSTRACT

Methods and apparatus for the characterization of formation fluids are disclosed. A downhole tool disposed in a borehole penetrating a subterranean formation obtains a NMR measurement, effects a change in a characteristic of the formation fluid, and obtains another NMR measurement subsequent to the change. Alternatively, the downhole tool effects a radial gradient of a characteristic of the formation and obtains NMR measurements at two or more selected radial distances from the wellbore wall. A parameter representative of the subterranean formation or the formation fluid is further determined from the NMR measurements.

17 Claims, 10 Drawing Sheets

106
ELECTRONICS AND PROCESSING
102
123
104
100
118
116
114
112
108
F
120
F
119
122
110

METHODS AND APPARATUS FOR MONITORING A PROPERTY OF A FORMATION FLUID

This patent application claims priority from U.S. Provisional Patent Application No. 60/978,008 filed Oct. 5, 2007 which is incorporated by reference herein in its entirety.

FIELD OF THE DISCLOSURE

This disclosure relates generally to oilfield exploration. More particularly, this disclosure relates to methods and apparatus for the downhole characterization of formation hydrocarbons.

BACKGROUND

More than fifty percent of the remaining global hydrocarbon resource is heavy oil and bitumen, which is a subset of unconventional hydrocarbon. Indeed, there are an estimated 942 billion barrels of conventional oil of which about 609 billion barrels (i.e., about 66%) are in the Middle East, and 85% of which are in the eastern hemisphere. The estimated recoverable reserve of heavy oil is about 434 billion barrels and there are about 651 billion barrels of bitumen. Of the total recoverable reserve of these two unconventional hydrocarbon sources, about 70% (equivalent to about 832 billion barrels of oil) reside in the western hemisphere; 81% of the bitumen is within North America; and 62% percent of the heavy oil is in South America. The total world oil reserve, including heavy oil, is about 2 trillion barrels which, at a consumption rate of 100 million barrels per day, has an estimated life of about 54 years.

According to the United States Geological Survey (USGS), heavy oil can be categorized according to the density and viscosity of the fluid. The definitions, listed in Table 1 shown below, were obtained from http://pubs.usgs.gov/fs/fs070-03/fs070-03.html. As can be seen in Table 1, the range of fluid viscosity defines the fluid and, ultimately, when combined with the formation permeability, determines fluid mobility.

Unconventional reserves are sampled to provide information for determining optimal recovery and design production strategies. There are many reasons why reservoir hydrocarbon samples should be acquired. For heavy oil and bitumen, samples are important because they can be used to evaluate production strategies and select the most energy efficient and environmentally acceptable production method. In the case of conventional oil, the sampling process typically extracts a sample with chemical composition and, therefore, physical properties that are representative of the formation fluid. The efficiency of sampling increases with increasing fluid flow-rate Q, which is given by Equation 1 below.

$$Q \propto \Delta p \cdot k / \eta \quad \text{Equation 1}$$

In Equation 1, $\Delta p$ is the pressure difference applied by the sampling tool to withdraw the hydrocarbon, $\eta$ is the hydrocarbon viscosity and k is the permeability. According to Equation 1, Q increases by increasing either $\Delta p$ or k and by decreasing $\eta$. In practice, the magnitude of $\Delta p$ is limited by the nature of the consolidation of the formation, and the maximum value of $\Delta p$ is that at which the formation collapses. Unconventional resources are often found in unconsolidated formations and this imposes another constraint on the sampling method because the borehole collapses when a large differential pressure is applied, which may be necessary during sampling of low mobility fluid. Formation testers are able to achieve pressures drops of about 50 MPa below formation pressure and often require sand filters. Other than fracturing the formation, there is little that can be done to vary k. As a result, sampling methods often rely on methods of decreasing the viscosity $\eta$.

There are numerous methods that can be used to decrease the hydrocarbon viscosity as well as to retrieve a chemically representative sample. Obtaining a chemically representative sample may prevent the application of many production methods to sampling because production typically requires the harvesting of energy. The exact chemical composition and physical properties of the formation hydrocarbon can and, indeed in the case of heavy oil and bitumen, have to be altered to produce it in an economically viable manner. In contrast, formation hydrocarbon obtained by sampling may cost orders of magnitude more than the market value of the quantity of formation hydrocarbon extracted.

TABLE 1

Definition of the type of heavy oil based on the density $\rho$, (API gravity) and viscosity $\eta$, of the fluid along with comments concerning mobility and current extraction methods

| Definition | $\rho$/kg · m$^{-3}$ | API | $\eta$/mPa · s | Comments |
|---|---|---|---|---|
| Medium heavy oil | 903 to 946 | 25 to 18 | 100 to 10 | Fluid mobile at reservoir conditions |
| Extra heavy oil | 933 to 1021 | 20 to 7 | 10 000 to 100 | Fluid not mobile at reservoir conditions |
| Tar sands and bitumen | 985 to 1021 | 12 to 7 | >10 000 | Not a fluid at reservoir conditions |
| Oil shale | | | | Fluid not mobile at reservoir conditions |

In addition to the USGS, the United Nations Information Centre for Heavy Crude and Tar Sands offers a definition for bitumen as petroleum having a viscosity >10,000 mPa's (10,000 cP), while petroleum with viscosity <10,000 mPa·s (10,000 cP) is defined as heavy oil. The latter is further segregated into heavy oil with an API gravity between 10 and 20° API and extra heavy oil with a gravity <10° API. For the purposes of the sampling described herein, these are the definitions for heavy oil, which are liquids at reservoir temperature, and bitumen that are solid (glass like) substances at reservoir temperatures.

SUMMARY

Figure 1:
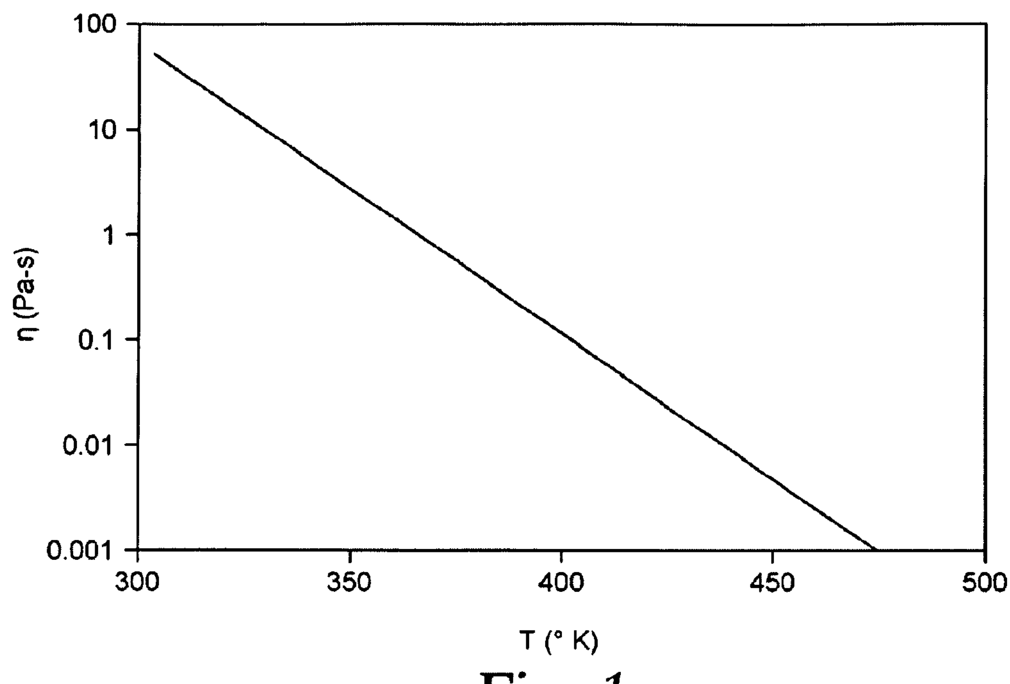
FIG. 1 is a chart of the relationship of viscosity and temperature for a crude oil.

In accordance with one example, a method to determine a parameter of a formation fluid with a tool disposed in a borehole penetrating a subterranean formation comprises obtaining a first NMR measurement on a formation fluid, effecting a change in a characteristic of the formation fluid, determining the change in the characteristic of the formation fluid, obtaining a second NMR measurement on the formation fluid subsequent to the change, and using the first and second NMR measurements and the formation fluid characteristic to determine a relationship between NMR measurements and the characteristic of the formation fluid.

In accordance with another example, a method to determine a parameter of a formation fluid with a tool disposed in a borehole penetrating a subterranean formation comprises obtaining a first NMR measurement of a formation fluid, using the first NMR measurement to determine a first formation fluid viscosity value, providing heat energy to the formation fluid, obtaining a second NMR measurement of the formation fluid, using the second NMR measurement to determine a second formation fluid viscosity value, and determining a relationship between a value indicative of an amount of energy provided to the formation fluid and the formation fluid viscosity based on at least the first and second formation fluid viscosity values.

In accordance with another example, an apparatus for determining a parameter of a formation fluid is disclosed. The apparatus includes an NMR tool to make NMR measurements of the formation fluid, a heating element, and a controller operatively coupled to the NMR tool and the heating element. The heating element changes a temperature associated with the formation fluid, and the controller is programmed to determine a relationship between an amount of energy associated with changing the temperature of the subterranean formation fluid and the viscosity of the formation fluid.

In accordance with another example, a method to characterize a subterranean formation with a tool disposed in a borehole penetrating the subterranean formation comprises effecting a radial gradient of a characteristic of the formation, obtaining a first NMR measurement at a first selected location in the formation; and obtaining a second NMR measurement at a second selected location in the formation. The method further comprises using the first and second NMR measurements and the gradient of the characteristic to determine a relationship between NMR measurements and the characteristic of the formation.

DETAILED DESCRIPTION

In general, the example apparatus and methods described herein to monitor the property of a formation fluid may be utilized for the evaluation of hydrocarbon properties, such as heavy oil properties, or the like. Additionally, while the examples disclosed herein are described mainly in connection with sampling operations for the oil and gas industry, the examples disclosed herein may be more generally applicable to a variety of operations for different purposes.

The use of the example techniques disclosed herein, which vary formation fluid viscosity (e.g., by heating the formation), and which employ nuclear magnetic resonance measurements, may be particularly advantageous in connection with formation sampling operations. Therefore, a brief discussion of the manner in which varying the viscosity of a formation fluid to facilitate the capture of a formation fluid sample with a downhole tool is provided.

One model that may be used to estimate the pressure drop that arises during sampling is a steady-state one-dimensional radial inflow according to Darcy's law as set forth in Equation 2 below.

$$V=(-K/\eta)\nabla p \qquad \text{Equation 2}$$

In Equation 2, V is the flow velocity vector, K is the permeability, $\eta$ is the viscosity, p is the local hydrostatic pressure, and $\nabla$ denotes a gradient operator. For steady-state incompressible radial inflow of the oil, the volumetric flow rate $\dot{V}$ across any spherical surface of radius r is constant and Equation 2 becomes Equation 3 as set forth below.

$$\dot{V}=-4\pi r^2(K/\eta)(dp/dr) \qquad \text{Equation 3}$$

If the collection device is a spherical sink of radius a centered on the origin in the non-isothermal case where the viscosity $\eta$ varies with distance from the probe, Equation 3 becomes Equation 4 below.

$$\dot{V}=\frac{-4\pi K\Delta p}{\{\int_a^\infty(\eta/r^2)\,dr\}}=\frac{-4\pi K\Delta p}{\{\int_1^\infty(\eta/z)\,d\ln z\}} \qquad \text{Equation 4}$$

In Equation 4, z=r/a and substitution of Equation 5 into Equation 4 yields Equation 6 below.

$$\eta_{eff}=\int_1^\infty(\eta/z)\,d\ln z \qquad \text{Equation 5}$$

(where $\eta_{eff}$ is an effective viscosity)

$$\dot{V}=-4\pi a(K/\eta_{eff})\Delta p \qquad \text{Equation 6}$$

In Equations 4 and 6, $\Delta p=(p\infty-pa)$ is the pressure difference created by the suction device between the pressure at r=a and the formation pressure $p\infty$. This model shows that the rate of fluid collection scales linearly with the amount of suction applied and the radius of the spherical tank into which the fluid flows. Of course, the actual sampling device has a circular orifice through which the fluid is drawn in from predominantly one side, rather than in all directions as considered in this spherical model, and the pressure drop estimated from Equation 6 will be in error. An estimate of the actual flow rate can be obtained from Equation 6 and the result multiplied by a geometric factor. Thus, if the flow were restricted to an angle of 0.4π (75° conical path), then either the pressure drop or sampling time would be increased by a factor of about 10 from that estimated from Equation 6 for the same volume of fluid collected. For a fluid with an effective viscosity of 300 mPa·s (300 cP) in a rock having a permeability of about $30\times10^{-12}$ $m^2$ (30 Darcy) with a=0.049 m and $\dot{V}$=1 $cm^3\cdot s^{-1}$ ($10^{-6}$ $cm^3\cdot s^{-1}$), Δp≈3 MPa (about 435 psi), while for an effective viscosity of 3000 cP the Δp≈33 MPa (about 4786 psi). For many heavy oils, the reservoir pressure is about 10 MPa (equivalent to about 1450 psi). A pressure drop of about 4700 psi may be physically unachievable while a pressure drop of 435 psi might induce a phase transition and, thus, the advantage of decreasing the viscosity of the hydrocarbon within the formation becomes clear. In this example, the viscosity may be decreased by increasing the temperature, as set forth below.

For example, the temperature dependence of the viscosity of a heavy oil, shown in FIG. 1, varies from 1 Pa·s (1,000 cP) at a temperature of 350° K. to 0.1 Pa·s (100 cP) at a temperature of 400° K., and implies a 50° K. temperature increase would suffice to permit sampling. The example of FIG. 1 corresponds to an Albanian oil of density 1024 $kg\cdot m^{-3}$ that is equal 6.6 API gravity.

The viscosities here may refer to a fluid obtained from a stock tank at a pressure of about 0.1 MPa. Thus, the viscosity may not include the contribution arising from the normally gaseous components that would also decrease the viscosity. For example, increasing the mole fraction of methane will decrease the viscosity up to the solubility limit. By analogy, a mole fraction of carbon dioxide of 0.3 decreases the viscosity of heavy oil by an order of magnitude.

The temperature dependence of viscosity varies according to the empirical rule of Vogel given by Equation 7 below.

$$\ln(\eta/\eta^o) = a + \frac{b}{c+T} \qquad \text{Equation 7}$$

In Equation 7, the reference viscosity may be chosen $\eta^0$=1 mPa·s (or 1 cP). The constants a, b, and c of Equation 7 are obtained by a non-linear adjustment to best represent measurements at a pressure. Equation 7 assumes that there is no change in the composition of the fluid, that is, the oil remains as a single phase fluid. Alternatively, at a given pressure, the temperature dependence of viscosity is described by the empirical rule as shown in Equation 8 below, similar to Equation 7:

$$\eta_o/\text{mPa}\cdot\text{s} = \exp[e + f/\{g + (T/K)\}] \qquad \text{Equation 8}$$

In Equation 8, the parameters e, f and g may also be determined by adjustment to best represent measured values.

Figure 2:
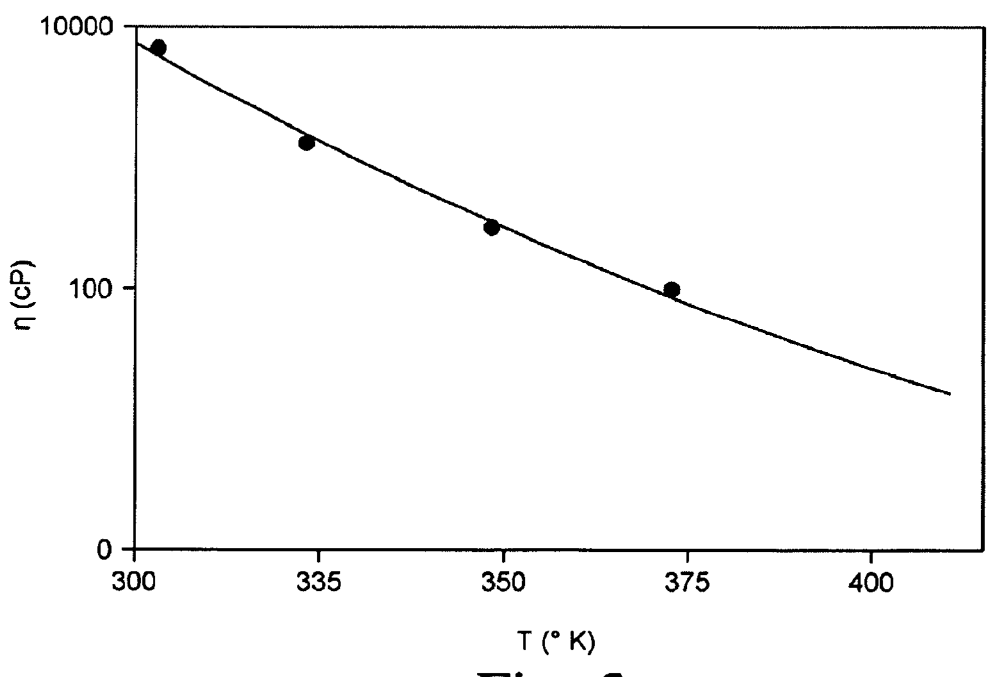
FIG. 2 is a chart of the relationship of viscosity and temperature for another crude oil.

At four temperatures between about 303° K. (30° C.) and 373° K (100° C.), the viscosity of a crude oil obtained from Mukhaizna in Oman has been measured. The measurements, shown in FIG. 2, were fit to Equation 7 coefficients a=6871.6821, b=13.9693° K and c=0° K and the estimates of Equation 7 are also shown in FIG. 2. At the formation temperature of 334° K (61° C.), the viscosity is 732 cP, and at a temperature of 433° K (160° C.), which is 100° C. above the formation temperature, an extrapolation of the measurements gives a viscosity of 6.7 cP and within the range that can be sampled by a formation sampler, such as, for example, a Modular Dynamics Tester (MDT) provided by Schlumberger Technology Corporation.

In addition to temperature, pressure may also affect the viscosity. The effect of pressure on viscosity depends on, among other things, the chemical composition of the fluid. An estimate of the variation of viscosity caused by a pressure change at constant temperature $(\partial\eta/\partial p)_T$ can be obtained from the measurements on a certified reference material for viscosity S20, which is a mixture of hydrocarbons. At T=60° C. $(\partial\eta/\partial p)_T\approx0.2$ $cP\cdot MPa^{-1}$ while at T=120° C. $(\partial\eta/\partial P)_T\approx0.05$ $cP\cdot MPa^{-1}$ and thus, a pressure change of 10 MPa contributes no more than an additional 2 cP to the viscosity. This example shows that pressure usually has a smaller effect on viscosity than temperature.

The viscosity η(T,p) of a fluid can be represented by the empirical Vogel-Fulcher-Tammann (VFT) equation which is Equation 9 below:

$$\eta(T, p)/\text{mPa}\cdot\text{s} = \exp\left\{a + b(p/\text{MPa}) + \frac{c + d(p/\text{MPa}) + e(p/\text{MPa})^2}{(T/K) - T_0}\right\}, \qquad \text{Equation 9}$$

In Equation 9, the six parameters a, b, c, d, e and $T_0$ are obtained by regression to measured viscosities. There are some other publications that describe alternative theories, some of which are based on assemblies of hard spheres, and others that, at this time, do not require chemical composition to use.

In addition to reducing the viscosity of the formation hydrocarbon to induce a sufficient flow rate with a reasonable drawdown pressure during a sampling operation, a reduction in the difference in the viscosity between fluids present in the formation may be required. This requirement is illustrated by the following example. The Al Khalata formation has an oil saturation of between 0.55 and 0.45. The phase that will flow when exposed to the sampling procedure is, in part, determined by the viscosity of the aqueous phase. The viscosity of ($NaCl+H_2O$) has been reported at molarities up to 5.6 $mol\cdot kg^{-1}$ at temperatures below 150° C. and pressures up to 31 MPa. Others have also reported measurements of the viscosity of aqueous solutions of KCl, $Na_2SO_4$ and $MgSO_4$. Based on these measurements, the viscosity of the NaCl aqueous phase of molarity 2 $mol\cdot kg^{-1}$ may be estimated to be about 1.3 cP at a temperature of 61° C. and pressure of 1.25 MPa. Based on some reported viscosities, values of absolute derivative of viscosity with respect to temperature $|(\partial\eta/\partial T)_p|<0.002$ $cP\cdot K^{-1}$ and derivative of viscosity with respect to pressure $(\partial\eta/\partial p)_T<0.0004$ $cP\cdot MPa^{-1}$ have been obtained that suggest at the temperatures of both 110° C. and 160° C. values of viscosity on the order of 1 cP are to be expected that are about 7 and 22 times lower than estimated for the viscosity of the oil. The viscosity of pure water at a reservoir temperature of 61° C. and pressure of 12.5 MPa is 0.462 cP, which is about a factor of 3 lower than for ($NaCl+H_2O$).

In addition to reducing the difference in the viscosity of the fluids present in the formation prior to conducting a sampling operation, reducing the viscosity of the formation hydrocarbon to minimize the foaming of the oil may be required. This requirement is illustrated by the following example. Some heavy oil tends to be foamy as a result of the mole fraction of normally gaseous components and the high viscosity. In general, the viscosity increases as the gas/oil ratio (GOR) decreases. Foam formation can prevent the acquisition of a representative sample and might occur when increasing the applied Δp. Foamy oil has been characterized by some as a colloidal dispersion of gas in a continuous liquid phase. Some have submitted that viscosity is the dominant physiochemical property controlling foam formation. Models to describe foamy oils and so called wormholes have also been discussed in certain literature. Thus, decreasing the viscosity (by increasing the temperature) reduces the possibility of foam formation and increases the probability of obtaining a representative sample. The size of oil-in-water emulsion droplets and their stability in turbulent flow has also been discussed in the literature for heavy oil and reported the probability of foam formation decreasing with decreasing viscosity.

In addition to sampling operations, the use of the example methods and apparatus disclosed herein, which vary the formation fluid viscosity and employ nuclear magnetic resonance measurements and/or monitoring, may be particularly advantageous in connection with the recovery of the formation oil. Thus, a brief discussion of the manner in which oil production may be enhanced is provided.

The methods used to recover heavy oil have been reviewed. Of these existing recovery methods, about 65% rely on increasing the temperature while 35% are non-thermal. Both approaches effectively decrease the hydrocarbon viscosity and increase the mobility. About 2% of the non-thermal methods rely on injecting a gaseous solvent that dilutes the heavy oil. However, the choice of dilutent is critical because of the possibly undesirable side effect of asphaltene precipitation. Vacuum pyrolysis, while not acceptable for sampling, has been proposed for both production and upgrading of bitumen because this method reduces decomposition reactions and gives a high yield of transportable oil and low gas volumes compared with other methods. Surfactants are used to assist with the transportation of heavy oil and these could be injected to effect sampling provided that the composition change was reversible. To prevent precipitation and fouling of pipelines, it has been suggested that hydrated cement linings are used because they are oleophobic, a concept that might have merit and be applied within sampling procedures. Other production methods, such as down hole upgrading of heavy oil with catalysts and in situ processes are also not applicable to sampling.

The effect of temperature on heavy oil recovery by imbibition in fractured reservoirs has been described in literature, including reports that increasing temperature increased the imbibition. The literature has also evaluated enhanced oil recovery methods for heavy oil in naturally fractured reservoirs from both a technical and economic perspective.

Of the thermal production methods, the most common method for increasing the temperature is steam injection, which accounts for about 78% of the thermal recovery methods, while <10% are achieved by in situ combustion. Steam has the added benefit of introducing a polar and immiscible dilutent. Water floods account for about 71% of the non-thermal methods. The effect of three phase flow on the recovery of oil during steam floods has been measured and correlated with a model for packed sand. The literature also provides evidence that steam increases the recovery of oil over that obtained solely with a hot water flood. However, similar recovery was achieved with nitrogen and suggests that three phase low is the dominant mechanism responsible for recovery. Other methods include Steam Assisted Gravity Drainage, known by the acronym SAGD, which is a thermal recovery method. Vapor extraction, known by the acronym VAPEX, is similar in concept to SAGD, except it is non-thermal and a vapor solvent is used to reduce viscosity of the heavy oil. The mechanism of thermally-assisted gas-oil gravity drainage for secondary and tertiary oil recovery has been investigated experimentally with a fractured porous media. In one study, a combination of waterflood followed by thermal stimulation for both water and oil wet fractured formations was found more effective than thermal recovery alone. Single-well steam-assisted gravity drainage has been studied and it has been concluded by some that formation of a steam chamber was the principle mechanism for heavy oil production, which is different from the mechanism of near-wellbore heating in SAGD. Cyclic steam injection has also been found more efficient than steam circulation. Still others have presented a model to optimize the SAGD process including net preset value, cumulative oil production and steam injected. In SAGD, an emulsion is produced and demulsifiers are required at the surface that include polyuaternary amines. SAGD can also be operated with a non-condensable gas such as $CO_2$ or butane and it is claimed the small amount of non-condensable gas fingers quickly to the top displacing oil downwards as well as reducing the total heat capacity of the injected fluid. It has also been claimed in some literature that the addition of a non-condensable gas decreased the rate of upward movement of heat and the formation of a steam chamber.

For VAPEX, carbon dioxide is usually the solvent with one potentially significant undesirable side effect of asphaltene precipitation. Some have proposed a mathematical model for VAPEX and found reasonable agreement with measurements for bitumen found in Cold Lake, Canada. Solution gas drive has been shown, with X-ray tomography, to provide higher than anticipated production rates for heavy oil, lower produced gas-to-oil ratios and high recovery factor. Others have suggested the rapid depletion of high viscosity fluids that contain asphaltene all contribute to the formation of the foamy oil.

An alternative production strategy that has been adopted is Cold Heavy Oil Production with Sand (CHOPS). Models have been produced to predict the variation in production rate arising from large wellbore fluid pressure reductions in unconsolidated sandstone reservoirs.

Turning again to sampling operations, the use of the example methods and apparatus disclosed herein, which vary the formation fluid viscosity and employ nuclear magnetic resonance measurements and/or monitoring, may be used to advantage with a sampling tool to determine a point at which a heavy oil sample may be taken. Thus, a brief discussion of sampling tools capable of obtaining a heavy oil sample is provided. The heavy oil sample should be chemically representative of the formation hydrocarbon with or without some solid suspension (mostly sand) and drilling fluid so that a suitable production strategy can be determined from the sample. The method chosen to extract the fluid should ultimately increase the fluid mobility in the reservoir and better the fluids flow within the tool so that it can be drawn into a sample retrieval vessel. Thus, the mobility enhancement may be achieved in such a manner that the sample composition either represents the important characteristics of the reservoir fluid sufficiently well or the physical characteristics have been changed in a reversible manner.

Sampling can occur by either thermal or non-thermal methods that may include injecting a dilutent. The thermal methods have an advantage over the non-thermal methods because the sample chemical composition may be changed by the introduction of a solvent. However, thermal methods may have two disadvantages: (1) to maintain a representative chemical composition, the upper temperature is limited by the decomposition (cracking) temperature to be <<900° K; and (2) the tubes within the tool, which interconnect the probe with the sample storage bottle, may also require heating to prevent the hydrocarbon blocking the sampling system. The second disadvantage can be at least partially overcome by either installing the sample bottle close to the probe or heating the flowlines with active feedback control and other methods.

For the purpose of this discussion, the two heavy oil provided above are used: an Albanian crude oil for which the viscosity varies from 1 Pa·s at a temperature of 350° K to 0.1 Pa·s at a temperature of 400° K (FIG. 1); and an Oman heavy oil with a viscosity of 732 cP at formation temperature (about 334° K) and an extrapolated viscosity value of viscosity 6.7 cP at a temperature of 433° K (FIG. 2). For both examples, it is clear from the preceding discussion that a temperature increment of less than 100° K. would decrease the viscosity sufficiently to permit sampling without reaching the temperature of thermal cracking.

Examples of methods to increase the fluid temperature are as follows: (I) a resistive heating element in contact with the borehole wall, for example, as provided by the Hydrate Melting Tool (HMT-C) provided by Schlumberger Technology Corporation; (2) passage of an a electrical current through the formation from two probes or inductive sources to provide Joule heating; (3) electromagnetic radiation emitted at a frequency that is absorbed by the hydrocarbon or connate or injected fluid by dipole relaxation (and varies according to the complex electric permittivity); (4) injecting hot water or steam; (5) utilizing an exothermic reaction, for example, the aqueous solvation of KOH with an enthalpy of solvation of $-60\ \mathrm{kJ \cdot mol^{-1}}$ that would require about 1 kg of KOH to yield 1 liter of oil; (6) acoustic stimulation of the oil or adjacent fluid either directly or indirectly; and (7) in-situ (controlled) combustion. Methods 1, 2, 3 and 5 could use either a heated surface attached to the borehole wall or a heat pipe or heat pump to conduct energy from within the tool to the formation. Further techniques for heating a formation are described below in connection with FIGS. 8-10.

The use of the example methods and apparatus disclosed herein, which vary the formation fluid viscosity and which employ nuclear magnetic resonance measurements and/or monitoring, may be particularly advantageous in relation to heating the formation. Thus, to demonstrate thermal propagation, an example based on an example method of the preceding paragraph is provided. The flow of heat is provided by the unsteady heat transport equation as shown in Equation 10 below.

$$(\partial T/\partial t)=\kappa\nabla^2 T \qquad \text{Equation 10}$$

In Equation 10, t is time and κ the thermal diffusivity of the medium. For an infinitesimal point heater of power P emitting into the infinite formation, the solution Equation 8 becomes Equation 11 below.

$$T = T_0 + \frac{P}{4\pi\lambda r}\operatorname{erfc}\left(\frac{r}{2\sqrt{\kappa t}}\right) \qquad \text{Equation 11}$$

In Equation 11, r is the distance from the point source, erfc is the complimentary error function, and $T_0$ is the initial uniform temperature when heating starts at time t=0.

For the case when a rectangular heater is used, similar to a probe pad located in the xy plane at z=0, the solution of Equation 10 is obtained by populating the rectangle with point sources emitting continuously to give the approximation of an infinite plane extending along the z axis close to the heater as shown below in Equation 12.

$$T = T_0 + \frac{2q}{\lambda}\left[\left(\frac{\kappa t}{\pi}\right)^{1/2}\exp\left(-\frac{z^2}{4\kappa t}\right) - \frac{z}{2}\operatorname{erfc}\left(\frac{z}{2\sqrt{\kappa t}}\right)\right] \qquad \text{Equation 12}$$

In Equation 12 q is the power per unit area and the temperature of the surface of the heater at z=0 is given by Equation 13 below.

$$T = T_0 + \frac{2q}{\lambda}\left(\frac{\kappa t}{\pi}\right)^{1/2} \qquad \text{Equation 13}$$

The solution of Equations 12 and 13 shows, because of the relatively low thermal conductivity, that the temperature at heater surface of z=0 increases to approximately 1000° K. This implies that the temperature of the surface should be controlled at a temperature $T_s$ and, in that case, Equation 14 below applies.

$$T - T_0 = (T_s - T_0)\operatorname{erfc}\left(\frac{z}{2\sqrt{\kappa t}}\right) \qquad \text{Equation 14}$$

The power is provided by Equation 15 below.

$$P = \frac{ab\lambda(T_s - T_0)}{\sqrt{\pi\kappa t}} \qquad \text{Equation 15}$$

In Equation 15, a is the width and b the length of the rectangular heater.

When the power is turned off at time $t_0$, the temperature profile is provided by Equation 16 below.

$$T = T_0 + \frac{2q}{\lambda}\left[\begin{array}{c}\sqrt{\kappa t}\,i\operatorname{erfc}\left(\frac{z}{2\sqrt{\kappa t}}\right) - \\ \sqrt{\kappa(t-t_0)}\,i\operatorname{erfc}\left(\frac{z}{2\sqrt{\kappa(t-t_0)}}\right)\end{array}\right] \qquad \text{Equation 16}$$

The temperature of the heater at z=0 is provided by Equation 17 below, valid for $t>t_0$.

$$T = T_0 + \frac{2q}{\lambda}\left(\frac{\kappa t}{\pi}\right)^{t/2}\left[1 - \sqrt{\frac{(t-t_0)}{t}}\right] \qquad \text{Equation 17}$$

Solving Equations 16 and 17 shows that the initial cooling is rapid (about 35 s to reduce $(t-t_0)$ by a factor of 2 for a 1 kW heater) but the rate of decrease decays rapidly. For a cylindrical heater of radius b inserted into a formation perpendicular to the borehole wall, solutions to Equation 10 have been provided by some. These solutions have been approximated for the case when the heater has negligible heat capacity, negligible thermal resistance and $t \gg b^2/4\kappa$ to yield Equation 18 below.

$$T = T_0 + \frac{q}{4\pi\lambda}\left[\ln\left(\frac{4\kappa t}{b^2\varepsilon}\right) + \left(\frac{b^2}{2\kappa t}\right)\ln\left(\frac{4e\kappa t}{b^2\varepsilon}\right)\right] \qquad \text{Equation 18}$$

In Equation 18, $\epsilon \approx 1.781$ is the exponential of Euler's constant and e the base of the natural logarithm.

The volume of formation to be heated to sample a volume $V_S$ of fluid can be estimated using Equation 19 below.

$$V_T=V_S/(\kappa_T \Delta p \phi S_o) \qquad \text{Equation 19}$$

In Equation 19, $\phi$ is the porosity, $S_o$ is the oil saturation, $\kappa_T$ is the isothermal compressibility, $\Delta p$ is the pressure reduction and $V_T$ is the total volume of heavy oil formation to be heated. For example, for a fluid with $\kappa_T = 5 \cdot 10^{-5}$ psi$^{-1}$, $\Delta p = 4$ kpsi, $\phi = 0.28$ and $S_o = 0.5$, Equation 19 yields $V_T/V_S = 33$, indicating that thirty-three times the required sample volume should be heated.

In another method of heating, an ac current I is emitted from a spherical electrode of volume V in a homogeneous medium of electrical conductivity $\sigma$, the power dissipated dP in a elemental volume dr·dS at a radius r from the electrode is provided by Equation 20 below.

$$dP = \frac{I^2}{16\pi^2\sigma}\frac{dSdr}{r^4} \qquad \text{Equation 20}$$

For a given intensity I=1 A, and conductivity $\sigma = 0.01$ S·m$^{-1}$, it is found that the dissipated power at r=1 m is dP=0.6 W·m$^{-3}$, while at r=0.1 m, the dissipated power is found to be dP=600 W·m$^{-3}$. This may be sufficient to heat the formation and permit sampling the fluid. Equation 20 is an approximation; however, a finite element analysis performed for defibrillators indicates the results obtained from Equation 20 are of the correct order of magnitude. Equation 20 requires knowledge of the conductivity or resistivity of the formation and assumes that the mud/filtrate has a significantly lower electrical conductivity than the formation.

Figure 3:
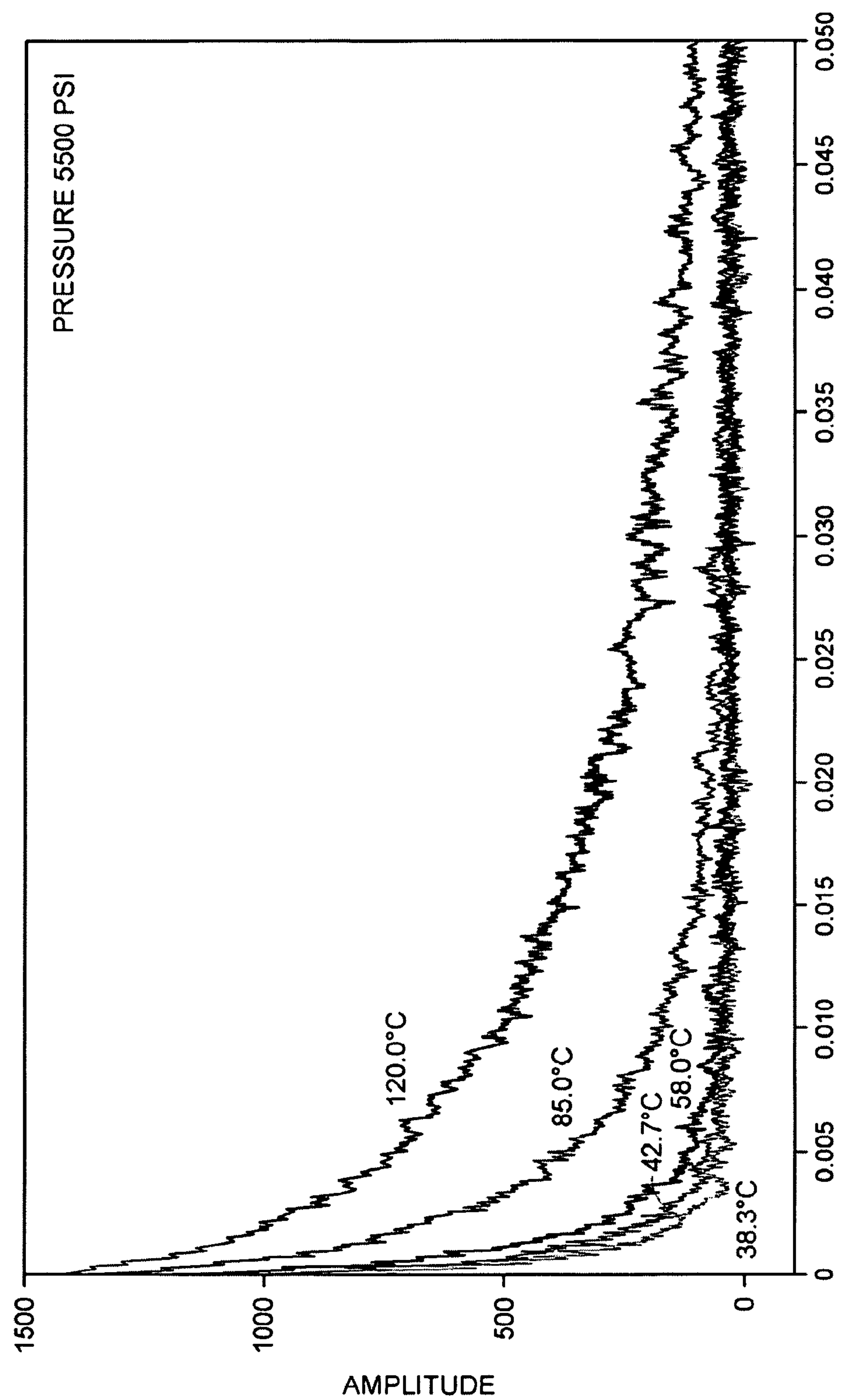
FIG. 3 is a chart of NMR T2 CPMG exponential decay curves for a heavy oil.
Figure 4:
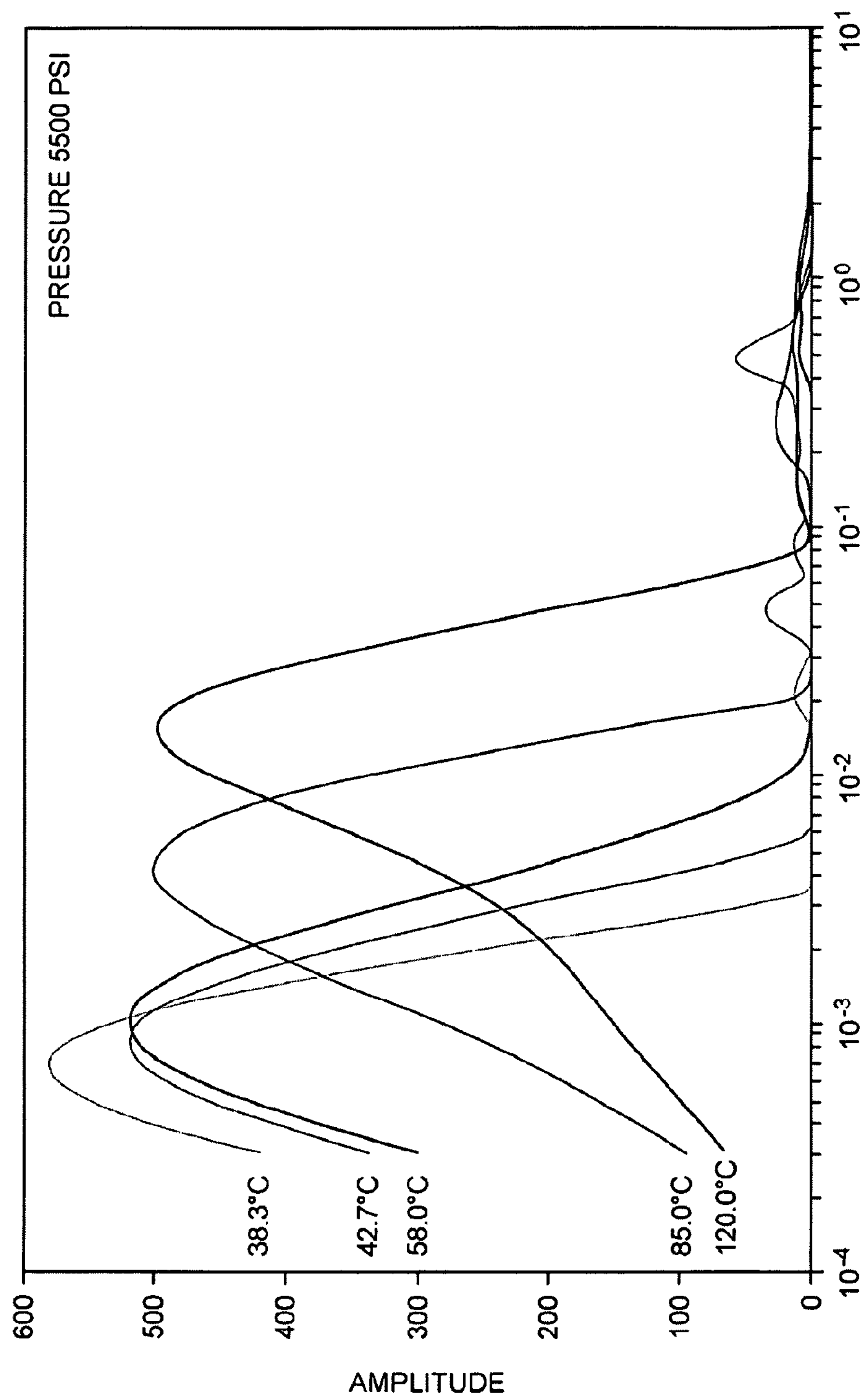
FIG. 4 is a chart of NMR T2 distributions for the heavy oil of FIG. 3.

Methods of measuring the viscosity of fluids within a formation have been described in the literature. One method to determine viscosity of the substance within the formation pores is to use nuclear magnetic resonance (NMR) measurements (or logging). FIG. 3 shows the NMR Carr, Purcell, Meiboom and Gill (CPMG) decay curves measured for a given oil at temperatures from 39.3° C. to 120° C. FIG. 4 shows the transverse relaxation time ($T_2$) distributions, computed from the decay curves in FIG. 3. The methods and apparatus described herein associate NMR measurements with a plurality of values of a characteristic of the formation fluid (in this case the temperature) for providing information about the formation fluid or the formation rock.

The methods and apparatus described herein may be used to advantage to design and implement a sampling process. In some cases the sampling process may require knowledge of the viscosity as a function of temperature or quantity of injected solvent for example. Absence of even order of magnitude estimates of viscosity may require a range of sampling methods to be deployed in a tool string to render acceptable the probability of returning a representative sample.

At a time, the NMR measurement may predict when the formation substance is sufficiently mobile that the sampling procedure with a wireline formation testing tool can commence. The viscosity measurements can be combined with values of the formation characteristics, wireline logging tool flowline pressures, or formation temperature amongst other, to determine the commencement of sampling operations. For example, a temperature controller may be used to control the temperature of a resistive heater.

The sampling process may be also constrained by the requirement to acquire a sufficient sample volume (e.g. about 1 liter for pressure, volume, temperature analyses). When a formation sampler, such as the Modular Dynamics Tester (MDT) by Schlumberger Technology Corporation, is used to acquire the sample, the hydrocarbon viscosity should be sufficiently reduced to permit flow through the internal tubulars of the tool at a rate of not less than 1 cm$^3$·s$^{-1}$. As a result, the hydrocarbon viscosity should be decreased to a value below 100 mPa·s without crossing the bubble pressure into the two phase region shown in FIG. 5; the pressure is also maintained above the bubble pressure. Typically, the sampling of conventional oil, which has a viscosity at reservoir temperature and pressure of approximately 1 mPa·s, occurs in less than 0.5 hour.

The example NMR measurement of viscosity provides a method of determining how long to heat the formation before sampling, regardless of the depth of observation into the formation of the NMR. The example method also allows real-time observation of the effectiveness of the heater and, if needed, deployment of alternative methods to mobilize the hydrocarbon with solvents.

Figure 5:
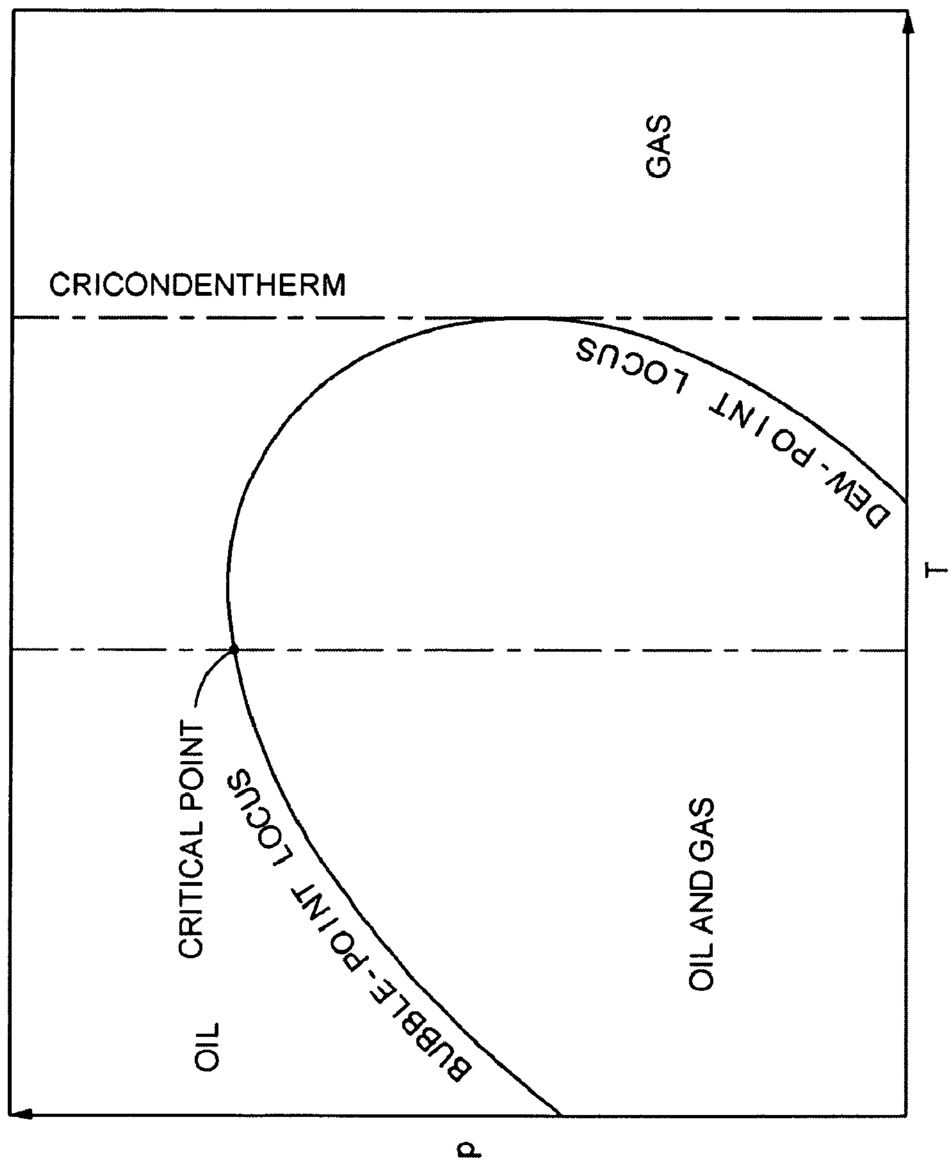
FIG. 5 is a chart of a section of the liquid to gas phase boundary of a fluid.

In one example, Nuclear magnetic resonance (NMR) measurements can be used to determine phase borders such as those shown in FIG. 5. FIG. 5 generally depicts a pressure/temperature (p, T) section of a fluid including the phase boundary. The example apparatus and methods described herein may be used to monitor phase transitions of the formation fluid via the NMR measurements to determine, for example, whether a liquid to gas transition might arise while sampling. Typically, a large variation of an NMR measurement occurring as a fluid characteristic is changed (either when changing the pressure or the temperature), may indicate a phase transition.

In another example, a heating element is used to mobilize the hydrocarbon by decreasing the viscosity. The formation hydrocarbon viscosity is determined simultaneously. The measured viscosity is used to determine the viscosity as a function of heater power, temperature, etc. . . . This gives an estimate of the thermal properties of the formation and when the formation hydrocarbon is at a viscosity that permits sampling of the required volume. In the examples described herein, the viscosity may be determined from NMR measurements provided by the Schlumberger Combinable Magnetic Resonance tool known by the acronym CMR (or equivalents thereof). Alternatively, the NMR measurements may be provided by the MRScanner (Mark of Schlumberger Technology Corporation), which makes nearly-simultaneous NMR measurements at multiple radial distances from the borehole wall.

The information provided above involves heavy oil and concerns the viscosity at reservoir temperature and the viscosity as a function of temperature. The response of an NMR measurement to viscosity variations with temperature were also presented herein. As the viscosity decreases, through increasing temperature, the mobility of the formation hydrocarbon increases. When the formation temperature is increased with, for example, a resistive heater in contact with the borehole wall, the viscosity of the hydrocarbon can be monitored with the NMR tool. For example, NMR viscosity measurements may be determined from the initial heating time and the results combined with a thermal model to predict the thermal wave penetration depth beyond that directly observed by NMR. The tool could be conveyed by wire-line, or drill-pipe, or coiled tubing or any other means used in the industry.

For NMR measurements with a limited depth of investigation into the formation, knowledge of the viscosity variation with temperature combined with a database of these variations for reservoir fluids as a function of applied heater time and power gives an estimate of the thermal capacity and/or the formation thermal diffusivity that could be used as an input parameter to calculate when sufficient time had been allotted for heating.

Although the mobilization techniques described in this example are based on thermal methods, other techniques using non-thermal stimulation could be employed instead of or in addition to these thermal techniques. In another example, an alternative to increasing the fluid temperature is the injection of a miscible solvent, such as halogenated or otherwise polar normal liquid hydrocarbon, with a preference for a chlorinated solvent in which asphaltenes dissolve. This provides a non-thermal method. For gases there is some evidence, particularly with $CO_2$, that precipitation of asphaltene does occur under some conditions. This approach could utilize a scheme similar to that shown in FIG. 9. Furthermore, if holes are drilled into the formation, a perforated tube may be inserted into the formation, resulting in a hole through which the solvent could be pumped, thereby effectively changing the composition of the formation by increasing the surface area over which the solvent acts. The solvent may be removed from the formation by means of a selective membrane in the tool. Utilization of a membrane within the tool would enable re-use of the solvent.

The above example is described as being implemented using the NMR which looks into the formation. However, the same measurement could be performed with an inward pointing flowline NMR, particularly if the line is heated. For a flowline NMR tool, examples can be found in U.S. Pat. Nos. 6,346,813, 6,825,657 and 6,891,369 to Schlumberger Technology Corporation, or U.S. Pat. No. 6,107,796, all hereby incorporated by reference herein in their entireties.

The example device comprises a flow line heater (or a dilutent syringe and inline mixer) in the flow line NMR module to measure formation fluid viscosity change with temperature as a downhole test. Optionally, a sample is captured in a flow loop having a flow NMR sensor. For flow loop hydraulics, see US 2006/0243033 or US 2006/0243047 published patent applications owned by Schlumberger Technology Corporation and hereby incorporated by reference herein in their entireties.

Figure 6:
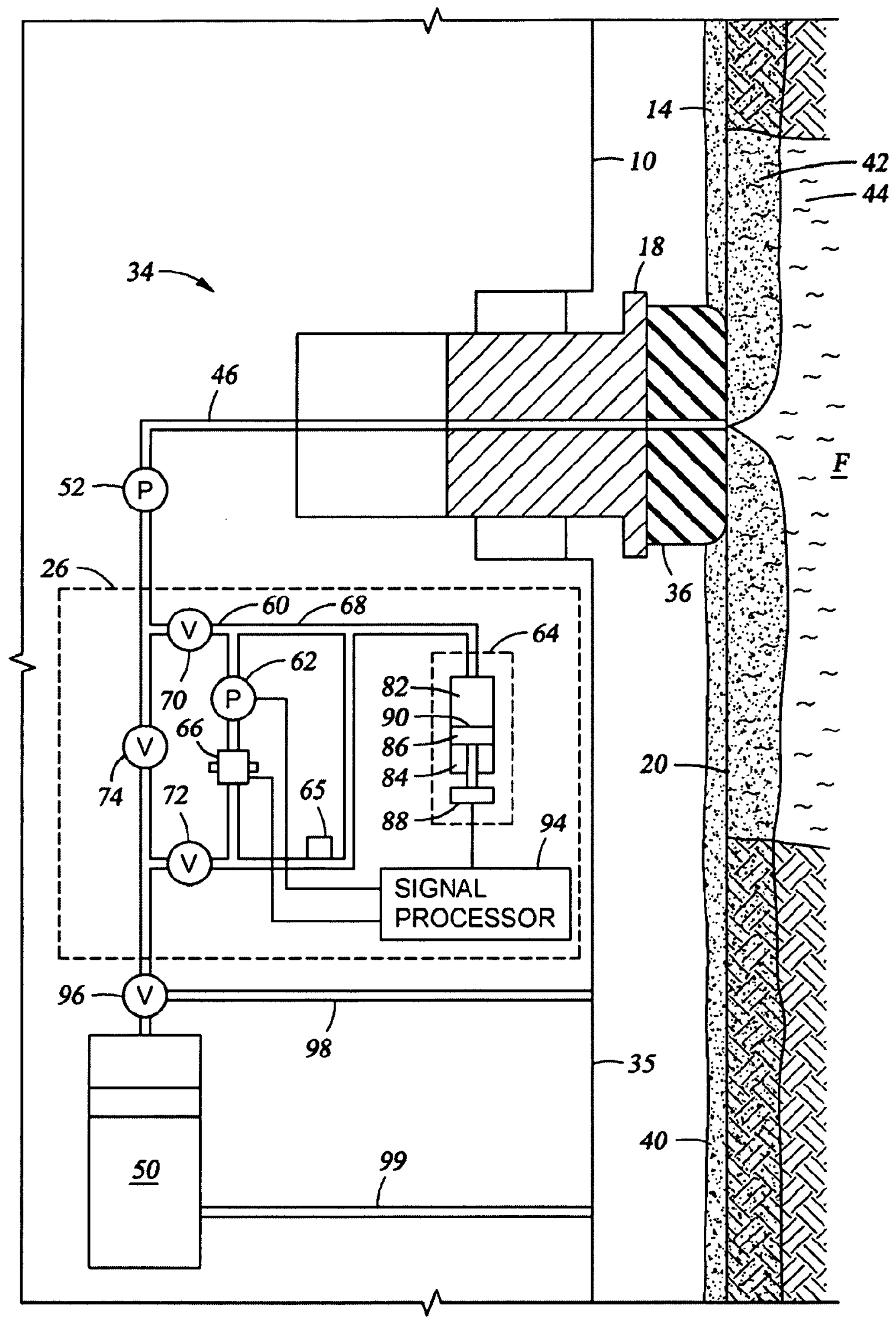
FIG. 6 is a schematic illustration of an example downhole tool located in a wellbore and having a NMR fluid analysis assembly.

Formation fluid may be drawn into a flow loop of a downhole tool having an NMR sensor for conducting NMR measurements of the formation fluid, the tool effecting a change in a characteristic of the formation fluid and determining a parameter of at least one of the formation or the formation fluid. Referring to an example apparatus, FIG. 6 is a schematic illustration of an example downhole tool 10 located in a wellbore 14 and containing a fluid analysis assembly 26. The downhole tool 10 includes a probe 18 extending from a housing 35 to engage a wellbore wall 20. The probe 18 is provided with a packer 36 for sealing engagement with the wellbore wall 20 by sealing with a mud cake 40 that lines the wellbore 14. Typically, the mud in the wellbore 14 seeps into the wellbore wall 20 and creates an invaded zone 42 about the wellbore 14. The invaded zone 42 contains mud and other wellbore fluids that contaminate the surrounding formations, including the formation F and a portion of the virgin formation fluid 44 contained therein.

A flow system 34 includes an evaluation flow line 46 extending from the probe 18. The evaluation flow line 46 is used to pass fluid, such as the virgin formation fluid 44, into the downhole tool 10 for pressure test, fluid analysis and/or sampling. The flow system 34 includes a pump 52 that draws fluid through the evaluation flow line 46 that extends to a sample chamber 50 for collecting samples of the virgin formation fluid 44. For a more detailed description of the flow system 34 and the fluid assembly 26, reference is made to US 2006/0243033, which was incorporated by reference herein in its entirely.

The fluid analysis assembly 26 is capable of effecting downhole measurements, such as phase measurement, viscosity measurements, and/or density measurements of the formation fluid 44. In general, the fluid analysis assembly 26 includes a chamber 60, a fluid movement device or pump 62, and one or more sensors 66, such as, for example an NMR sensor. The fluid assembly also comprises at least one of a pressurization assembly 64 and an associated pressure sensor 66 for sensing a pressure in the chamber 60, a heating device 65 and an associated temperature sensor 66 for sensing a pressure in the chamber 60, and a dilutent syringe and inline mixer (not shown).

The chamber 60 defines an evaluation cavity 68 for receiving the formation fluid 44. The chamber 60 may have any configuration capable of receiving and permitting movement of the formation fluid 44 as discussed herein so that the measurements can be accomplished. For example, as shown in FIG. 6 the chamber 60 may be implemented as a bypass flow line communicating with the evaluation flow line 46 so that the formation fluid can be positioned or diverted into the bypass flow line. The fluid analysis assembly 26 may also be provided with a first valve 70, a second valve 72, and a third valve 74 for diverting the formation fluid 44 into and out of the chamber 60, as well as isolating the chamber 60 from the evaluation flow line 46.

To divert the formation fluid 44 into the chamber 60, the first valve 70 and the second valve 72 are opened while the third vale 74 is closed. This diverts the formation fluid 44 into the chamber 60 while the pump 52 is operating. Then the first valve 70 and the second valve 72 are closed to isolate or trap the formation fluid 44 within the chamber 60. If desired, the third valve 74 can be opened to permit normal or a different operation of the downhole tool 10. For example, the third valve 74 can be opened and the first and second valves 70 and 72 closed while the fluid in the chamber 60 is being evaluated or tested.

The fluid movement device 62 may be operated to move and/or mix the formation fluid 44 within the evaluation cavity 68 to enhance the homogeneity, of the fluid 44. Preferably, formation fluid 44 is moved through the evaluation cavity 68 to enhance the accuracy of the measurements obtained by the sensor(s) 66. The fluid movement device 62 may be any type of pump or device capable of re-circulating the formation fluid 44 within the chamber 60.

The sensor(s) 66 may be positioned immediately adjacent a discharge side of the fluid movement device 62 to be within the vortex formed by the device 62. The sensor(s) 66 may be any type of sensor capable of determining a fluid characteristic, such as the phase behavior or the viscosity of the formation fluid 44. The sensor(s) 66 may be, for example, a pressure sensor, a temperature sensor, a density sensor, a viscosity sensor, a camera, a visual cell, an NMR sensor, a Near Infra Red spectrometer, or the like.

The pressurization assembly 64 changes the pressure of the formation fluid 44 drawn within the chamber 60. The pressurization device 64 may be any type of assembly or device capable of communicating with the chamber 60 and continuously changing (and/or step-wise changing) the volume of pressure of the formation fluid 44 within the chamber 60. In the example downhole tool 10 illustrated in FIG. 6, the pressurization assembly 64 includes a decompression chamber 82, a housing 84, a piston 86, and a piston motion control device 88. The piston 86 has an outer face 90, which cooperates with the housing 84 to define the decompression chamber 82. The piston motion control device 88 controls the movement and location of the piston 86 within the housing 84 to effectively change the volume of the decompression chamber 82. As the volume of the decompression chamber 82 changes, the volume or the pressure within the chamber 60 also changes. Preferably, a pressure sensor 66 tracks the pressure changes in the chamber 60 resulting from the operation of the pressurization assembly 64.

The internal heating device 65 changes the temperature of the formation fluid 44 drawn within the chamber 60. The heating device 60 may be of any type of assembly or device capable of communicating heat into the chamber 60 and changing the temperature of pressure of the formation fluid 44 within the chamber 60. In one embodiment, the heating device 65 comprises a resistive wire thermally coupled to the chamber 60 and controllably coupled to an electric power source. Preferably, a temperature sensor 66 tracks the temperature changes in the chamber 60 resulting from the operation of the heating device 65. Preferably also, a current sensor operatively associated with the heating device 65 tracks the thermal power or thermal energy generated by the heating device 65.

The dilutent syringe and inline mixer (not shown) changes the composition of the formation fluid 44 drawn within the chamber 60. The dilutent syringe is fluidly coupled to the chamber 60 and controllably injects a dilutent conveyed by the downhole tool 10 into the chamber 60. A volume injected by the syringe is preferably measured, for example with a displacement sensor, e.g. a potentiometer.

The fluid analysis assembly 26 is also provided with a signal processor 94 to communicate with the fluid movement device 62, the sensor(s) 66, and the piston motion control device 88 and/or the heating device 65. In use, the signal processor 94 may selectively actuate the valves 70, 72 and/or 74 to divert the formation fluid 44 into the chamber 60, as described above. The processor 94 may close the valves 70 and 72 to isolate or trap the formation fluid 44 within the chamber 60, and then actuate the fluid movement device 62 to move the formation fluid 44 within the chamber 60 in a re-circulating manner. As shown in FIG. 6, this re-circulation forms a loop that passes the pressurization assembly 64, the heating device 65, and includes the sensor(s) 66 and the fluid movement device 62.

The signal processor 94 may actuate the piston motion control device 88 to begin changing the pressure within the chamber 60 in a predetermined manner. In one example, the signal processor 94 actuates the piston motion control device 88 to continuously depressurize the formation fluid 44 within the chamber 60 at a rate suitable to effect phase measurements in a short time, such as less than fifteen minutes. While the chamber 60 is being continuously depressurized, the signal processor 94 collects data from the sensor(s) 66 to effect an NMR measurement while also monitoring the pressure within the chamber 60 to provide, for example, a viscosity of the formation fluid 44 from NMR measurements as a function of fluid pressure. In particular, abrupt changes in viscosity may be used to effect an accurate measurement of the phase behavior of the formation fluid 44 (as illustrated in FIG. 5).

The signal processor 94 may also actuate the heating device 65. While the chamber 60 is being continuously heated, the signal processor 94 collects data from the sensor(s) 66 to effect an NMR measurement while also monitoring at least one of the temperature within the chamber 60 and the thermal power generated by the heating device 65 to provide, amongst other things, a viscosity of the formation fluid 44 from NMR measurements as a function of fluid temperature. In particular, abrupt changes in viscosity may be used to effect another accurate measurement of the phase behavior of the formation fluid 44 (as illustrated in FIG. 5).

Similarly, the signal processor 94 may also actuate the dilutent syringe and provide a viscosity of the formation fluid 44 from NMR measurements as a function of the volume or concentration of dilutent in the formation fluid 44.

The downhole tool 11 may also include a fourth valve 96 to selectively divert the formation fluid 44 into the sample chamber 50, or to the wellbore 14 via a return line 98. The sample chamber 50 may include an exit port 99 extending to the wellbore 14.

Figure 7:
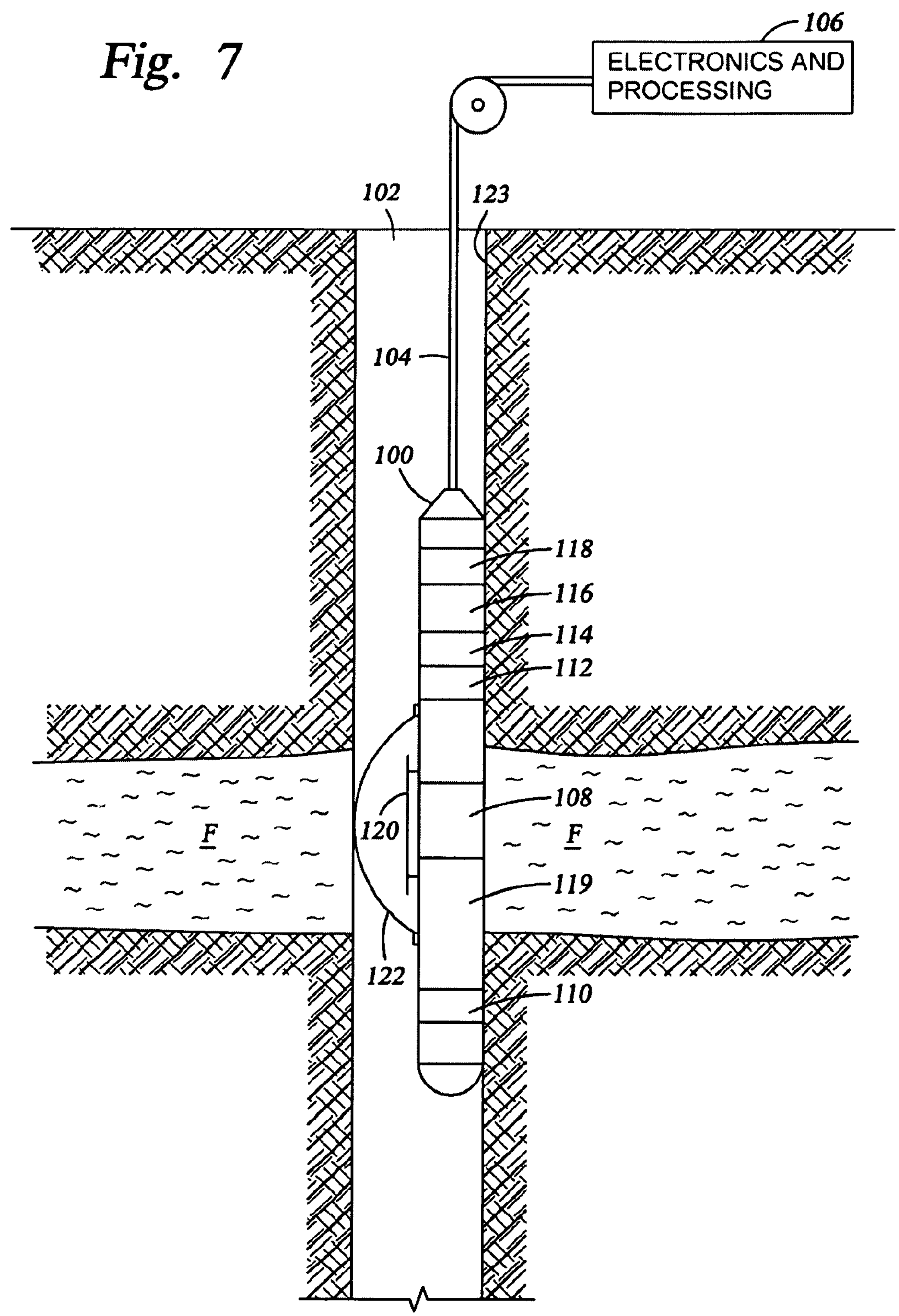
FIG. 7 is a schematic illustration of an example NMR monitoring tool of downhole formation.
Figure 8:
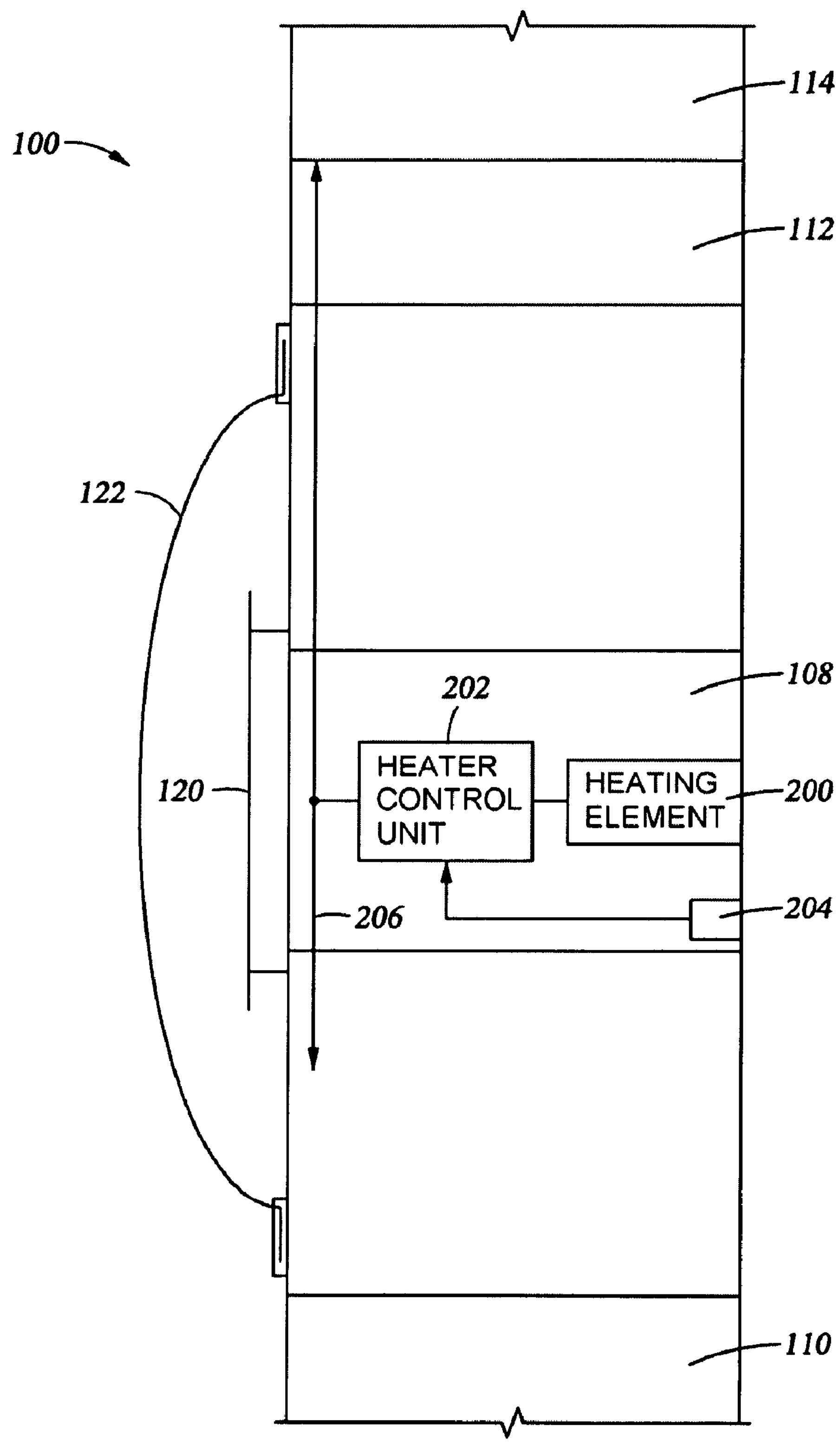
FIG. 8 is a more detailed schematic illustration of the heating portion of the example monitoring tool of FIG. 7.

FIGS. 7 and 8 are schematic illustrations of an example heating tool and/or devices that may be used with the example methods and apparatus described herein to heat a formation. FIG. 7 depicts an example downhole formation heating tool 100 that has been deployed (e.g., lowered) into a wellbore or borehole 102 to heat a portion or volume of a subterranean formation F from which a sample of a heavy oil is to be obtained. The formation heating tool 100 is depicted as a wireline type tool and, thus, is lowered into the borehole 102 via a cable 104 which bears the weight of the formation heating tool 100 and includes electrical wires or additional cables to convey power, control signals, information carrying signals, etc. between the formation heating tool 100 and an electronics and processing unit 106 on the surface adjacent the borehole 102.

The formation heating tool 100 includes a plurality of sections, modules, or portions commonly referred to as subs to perform various functions. More specifically, the formation heating tool 100 includes a heater section or heating module 108 that, as described in greater detail below, applies a controlled amount of heat energy (e.g., a controlled temperature for a predetermined time and/or in response to NMR measurements) to the formation F to heat a volume of the formation F from which a sample of heavy oil, for example, is to be extracted.

In FIGS. 7 and 8, the formation heating tool 100 may also include packers 110 and 112. One or both of the packers 110 and 112 may be used to minimize or eliminate the conduction of heat away from an area of the formation F being heated by the heating module 108. For example, both of the packers 110 and 112 may be expanded to hydraulically isolate a section of the borehole occupied by the heating module 108. Thus, with the heating module 108 aligned with a section of the borehole 102 corresponding to the formation F, hydraulically isolating the heating module 108 enables the heating module 108 to deliver substantially all of its heat energy to the formation F. In other words, using one or both of the packers 110 and 112 to hydraulically isolate the area of the formation F to be heated minimizes or prevents the heat energy generated by the heating module 108 from being carried away to other portions of the borehole 102 via borehole fluid.

To determine the location or position of the heating tool 100 in the borehole 102, the heating tool 100 illustrated in FIGS. 7 and 8 includes a position detector 116. The position detector 116 may detect the depth and orientation (e.g., rotational or angular position) of the heating tool 100 within the borehole 102. The position detector 116 may be implemented using, for example, one or more magnetometers or the General Purpose Inclinometry Tool (GPIT) provided by Schlumberger Technology Corporation. Alternatively, the position detector 116 may be configured to provide only information relating to the orientation of the heating tool 100, and the depth of the heating tool 100 within the borehole 102 may instead be determined using any known method of determining depth such as, for example a gamma-ray device, cable flagging, or any other method of determining or measuring the length of the cable 104 extending from the surface into the borehole 102.

To convey power, communication signals, control signals, etc. between the surface (e.g., to/from the electronics and processing unit 106) and among the various sections or modules composing the heating tool 100, the heating tool 100 includes an electronics module 118. The electronics module 118 may, for example, be used to convey position information provided by the position detector 116 to the electronics and processing unit 106 to enable an operator and/or system on the surface to determine the location or position of the heating module 108 in the borehole 102. In particular, the position information may be used to align the heating module 108 with the formation F and may subsequently be used to position a sampling tool and its sampling probe(s) in substantially the same location of the formation F previously heated by the heating module 108. The electronics 118 may also control the operation of the pumping module 114 in conjunction with operation of the packers 110 and/or 112 to, for example, hydraulically isolate a portion of the borehole 102 to facilitate heating of a portion of the formation F.

To measure properties (e.g., viscosity) of the fluid in the formation F during heating of the formation F, the tool 100 may include NMR measurement equipment or module 119 to enable measurements (e.g., viscosity measurements) of the fluid in the formation F during heating of the formation F. Use of NMR equipment in this manner is described generally above. Additionally, the use of NMR measurements to measure fluid and/or formation properties is described in U.S. Pat. Nos. 6,597,171; 6,891,369; and 7,091,719, all of which are incorporated herein by reference in their entireties.

As depicted in FIGS. 7 and 8 the heating tool 100 also includes a heat reflector 120 and a bow spring 122. The heat reflector 120 is attached to a side of the heating tool 100 so that heat applied by the heating module 108 to a wall 123 of the borehole 102 is reflected and/or focused on the side of the heating tool 100 that is in contact with the portion of the formation F to be heated. The heat reflector 120 is preferably, but not necessarily, configured to have a curved shape that is complementary to the shape of the heating tool 100. Additionally, the heat reflector 120 may be sized to encircle about ninety degrees or more of the outer circumference of the heating tool 100 and to extend over at least the length of the heating module 108 portion of the heating tool 100. However, a variety of other geometries and/or sizes could be used to effectively reflect heat generated by the heating module 108 back onto the area of the borehole wall 123 being heated by the heating module 108. The bow spring 122 is positioned on the heating tool 100 adjacent the reflector 120 to orient the heating tool 100 against or in contact with the wall 123 of the borehole 102 and, thus, to cause the heating module 108 to engage or contact an area of the formation F to be heated. While the example heating tool 100 is depicted as having one bow spring 122, additional bow springs could be employed and/or different mechanisms or techniques could be employed to ensure that the heating module 108 engages or contacts the wall 123 of the borehole 102 in the area of the formation F. Further, while the example heating tool 100 is depicted as being deployed in the borehole 102 as a wireline device, the heating tool 100 could alternatively or additionally be deployed in a drill string, using coiled tubing, or by any other known method of deploying a tool into a borehole. Still further, the example heating tool 100 may be implemented by modifying one or more existing tools. For example, either or both of the Hydrate Melter and the PatchFlex products provided by Schlumberger Technology Corporation could be modified to provide the features and functions of the example heating tool 100 of FIG. 7.

To control the location or position of the heating tool 100 in the borehole 102, the tool 100 may comprise an anchor (not shown) operatively associated to a first portion of the tool 100, and a joint (not shown) disposed between the first portion of the tool 100 and a second portion of the tool. The second portion of the tool preferably comprises the heating module 108 and the NMR module 119. The anchor may be extended against the wellbore wall for immobilizing the first portion of the tool at a selected location in the wellbore 102. The joint comprises an extension and/or rotation mechanisms to controllably move the second portion of the tool with respect to the anchored first portion of the tool. Thus, the heating module 108 and the NMR module 119 may be aligned with one location of the formation F by moving the second portion of the tool with respect to the first portion of the tool. Further details about methods and apparatuses to locate a plurality of modules in a wellbore may be found in U.S. patent application Ser. No. 11/782,819 hereby incorporated by reference herein in its entirety.

FIG. 8 is a more detailed view of the example heating tool 100 of FIG. 7. As shown in FIG. 8, the heating module 108 includes a heating element 200, a heater control unit 202, and a temperature sensor 204, all of which are operatively coupled to heat an area or volume of a formation (e.g., the formation F) to a desired temperature to decrease the viscosity and increase the mobility of a fluid to be sampled from the formation F. The heating element 200 may be implemented using, for example, one or more resistive Wires that may, for example, be coiled about an inside or outside surface of the example tool 100 in the area of the heating module 108. The wires used to implement the heating element 200 may be similar to those used in the Hydrate Melter and/or the PatchFlex products provided by Schlumberger Technology Corporation.

The temperature sensor 204 may be implemented using any suitable temperature sensing device and is mounted on the heating tool 100 to sense the temperature of the formation being heated and/or the temperature of the heating element 200. The temperature sensor 204 sends signals (e.g., a changing resistance value) to the heater control unit 202 which, in turn, controls the heat energy being generated by the heating element 200. For example, based on the signals received from the temperature sensor 204 (e.g., based on the temperature of the portion of the borehole wall 123 corresponding to the area of the formation being heated), the heater control unit 202 varies the heat energy generated by the heating element 200. In some examples, the heater control unit 202 may provide a continuously variable current or voltage to the heating element 200, may pulse modulate a substantially fixed peak current or voltage to the heating element 200, or may vary the electrical energy provided to the heating element 200 in any other manner to increase or decrease the heat energy generated by the heating element 200. By controlling the heat energy generated by the heating element 200 based on the temperature sensed by the temperature sensor 204, the heater control unit 202 can control the temperature gradient to which the formation being heated is subjected, thereby minimizing or preventing the possibility that the formation F will be compromised by thermal cracking. The thermal conductivity of the formation F may be relatively low, which results in slow temperature propagation through the formation F. Thus, by controlling the temperature of the portion of the borehole wall 123 associated with the area of the formation F being heated, the maximum temperature gradient to which the formation F is subjected can be controlled or limited to prevent any damage (e.g., thermal cracking) to the formation F.

The heater control unit 202 and/or signals received from the electronics module 118 via signals lines 206 may cause the heater control unit 202 to heat the formation F for a predetermined amount of time or, as described above, heat the formation F in response to NMR measurements made via the NMR equipment or module 119 (see FIG. 7) indicating that a target or desired formation fluid viscosity has been achieved. The electronics module 118 may be programmed to determine a relationship between the energy associated with changing the temperature of the formation and the viscosity of the formation fluid. In general, a longer heating time increases the temperature of a larger volume of the formation F to a temperature that facilitates extraction of heavy oil from the formation F. In some cases, heating a formation for several hours increases the temperature of a volume of the formation by 50° C. and enables about one liter of heavy oil to be extracted. However, the amount of time required to heat a formation depends on many factors such as, for example, the properties (e.g., viscosity, density, etc.) of the heavy oil to be extracted, the characteristics (e.g., thermal conductivity, permeability, etc.) of the formation from which the heavy oil is to be extracted, the power or maximum heat energy that can be delivered by the heating module 108, the maximum safe thermal gradient to which the formation can be subjected, the size or volume of the sample desired (i.e., a larger sample may require heating a larger volume of the formation), etc.

Figure 9:
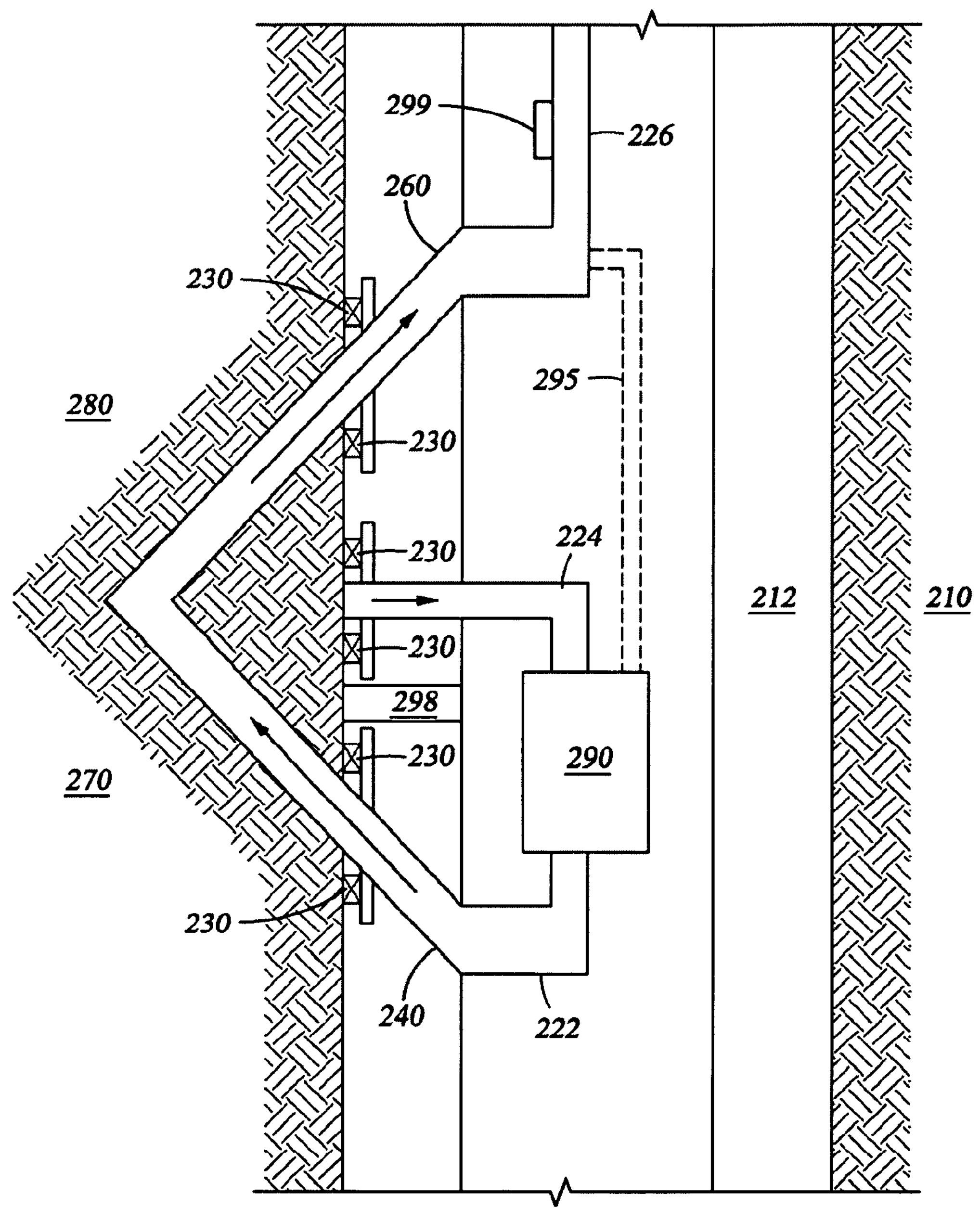
FIG. 9 is a schematic illustration of an alternative for the heating portion of FIG. 8 that employs injection techniques.

An example of an injection tool 220 is shown in FIG. 9 where the formation is penetrated by two intersecting holes, which are to provide other means of increasing the mobility of the reservoir fluid. FIG. 9 generally depicts a cross-section through a formation 210 containing, for example, heavy oil and a bore-hole 212 within which the tool 220 is located. The tool 220 can be conveyed by wire-line, or drill-pipe, or tubing or any other means used in the industry. In the example shown in FIG. 9, the tool 220 is fitted with three flowlines 222, 224 and 226, each of which may be fitted with a packer 230 for selectively establishing an exclusive fluid communication between the tool flow line and the formation 210, along with probes 240, 250 and 260 for moving fluids in an out the tool 220, and a means of drilling holes (not shown) at locations 270 and 280. A mobility enhancer substance may be transported down-hole, or the wellbore fluid may be at a temperature greater than the temperature of the formation and be used as a mobility enhancer, or downhole fluids may be captured in the tool 220, heated at a module 290 and used as a mobility enhancer. The mobility enhancer substance may be injected or forced into the formation from the module 290 through the flowline 222 and the probe 240 (e.g., a perforated tube) into the location 270 and may affect the composition, the temperature or the pressure thereof. Alternatively or additionally, the mobility enhancer substance can be sampled back in the tool 220 by transmitting the mobility enhancer substance and the formation fluid through the location 280 into the probe 260 where it passes through the flowline 226 and a flow line 295 into the module 290.

In one example arrangement, the module 290 is a tank comprising a dilutent or solvent. The dilutent is either delivered directly into the formation or is mixed with downhole fluid (e.g. wellbore fluid, formation fluid) captured by the probe 230. In this embodiment, the module 290 is adapted for measuring the volume or rate at which the dilutent or solvent is injected in the flowline 222. In another example arrangement, the module 290 is a heater internal to the tool 220. Downhole fluid enters the module or heater 290 where its temperature is increased further and is subsequently injected through the flowline 222 and the probe 240 into the location 270. In this other embodiment, the module 290 is preferably adapted for tracking a thermal energy transmitted to the injected fluid.

The tool 220 may also comprise one or more sensor(s) 299 for measuring a pressure, temperature, or composition of the fluid flown in the flow line of the tool (e.g. flowline 224, 226).

Thus, the tool 220 may be used to effect and measure a characteristic (e.g. a pressure, a composition, or a temperature) of the formation fluid located proximate to the NMR sensor 298 in the formation 210. The response of the formation fluid to the changes of the characteristics is monitored through measurements of the hydrocarbon fluid viscosity with an NMR module 298. A plurality of NMR measurements are associated with at least one characteristic of the formation fluid (e.g. one of a pressure, a composition, or a temperature of the formation fluid) and a relationship or correlation between the characteristic of the formation fluid and the NMR measurements is determined as further detailed therein.

Figure 10:
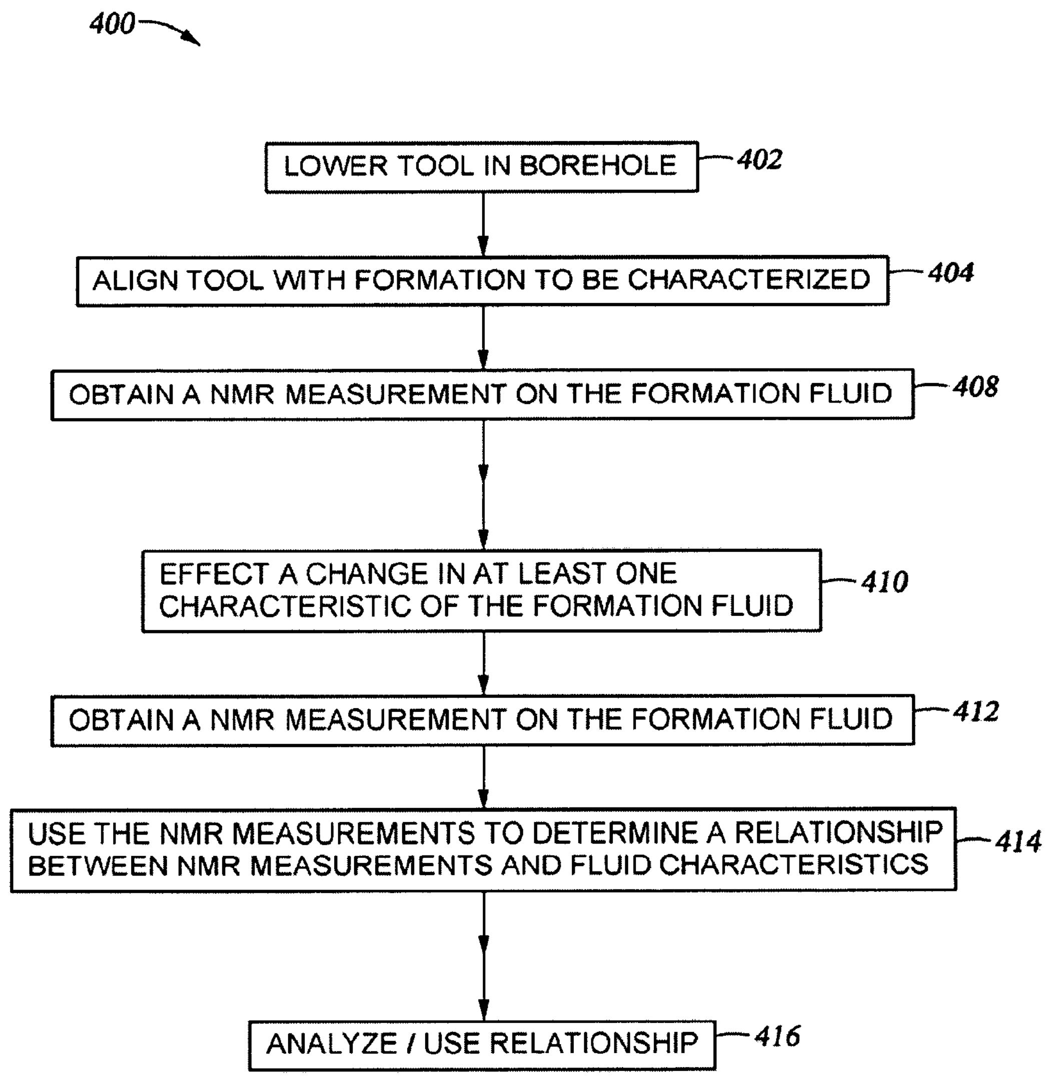
FIG. 10 is a flow chart representative of an example method to use an example apparatus to conduct NMR measurements of a downhole formation fluid.

FIG. 10 depicts an example method 400 to use an example apparatus described herein to conduct NMR measurements of a downhole formation fluid. As shown in the example method 400 of FIG. 10, a tool (e.g., a downhole tool 10 in FIG. 6 or a heating and/or sampling tool 100 in FIGS. 7 and 8 and/or the injection tool 220 in FIG. 9) is lowered into a borehole (block 402) and is aligned with a formation (e.g., a formation F in FIG. 6 or a formation F in FIG. 7) to be tested (block 404). If the downhole tool 10 in FIG. 6 is used, a portion of formation fluid is then captured in the tool (e.g. in the chamber 60) for analysis. Otherwise, the formation fluid may be tested in-situ (e.g. in the formation F).

The example method 400 then obtains a first NMR measurement (e.g., the NMR sensor 66 in the downhole tool 10 in FIG. 6, the NMR module 119 in FIG. 7 or the NMR sensor 298 in FIG. 9) of the formation fluid (block 408). In some cases, the NMR measurement is processed for determining a physical property (e.g., viscosity) representative of the formation fluid.

The tool (e.g., the downhole tool 10 in FIG. 6 and/or the heating and/or sampling tool 100 in FIGS. 7 and 8 and/or the injection tool 220 in FIG. 9) is then utilized to effect a change in at least one characteristic (e.g., one of pressure, composition, temperature) of the formation fluid (block 410). More particularly, formation fluid may be mobilized (e.g., using the heating module 108 in FIG. 7 to heat the formation F and lower the viscosity of the formation fluid or by circulating a mobility enhancer through the intersecting holes in FIG. 9). Alternatively, the formation fluid may be expanded and/or compressed, heated, mixed with a solvent in a circulating chamber 60 in the downhole tool 10 in FIG. 6. The change of the formation fluid characteristic is preferably quantified. For example, a temperature sensor (see e.g. sensors 66 in FIG. 6, temperature sensor 204 in FIG. 8, sensors 299 in FIG. 9), a pressure sensor (see e.g. sensors 66 in FIG. 6, sensors 299 in FIG. 9), a sensor configured to measure the thermal energy produced (see e.g. control unit 202 in FIG. 8) or the amount of dilutent injected (provide for example by module 290 in FIG. 9) is utilized to track the changes of the formation fluid characteristic. In some cases, a model (e.g. a thermal model as described in Equations 10 through 20) may be used to determine the change in the characteristic of the formation fluid on which the NMR measurement is performed. Indeed, the temperature gradient in the formation may not be measured directly. In this case, temperature at the wellbore wall may be measured together with the heating energy transmitted to the formation. A value of thermal diffusivity of the formation may be adjusted so that the thermal model described in Equations 10-20 predicts the measured temperature response measured by the temperature sensor.

A second NMR measurement (e.g., the NMR sensor 66 in the downhole tool 10 in FIG. 6, the NMR module 119 in FIG.

7 or the NMR sensor 298 in FIG. 9) of the formation fluid is then obtained (block 412). Again, the NMR measurement may be processed for determining a physical property (e.g., viscosity) representative of the formation fluid.

The method 400 then uses the first and second NMR measurements to determine a relationship between NMR measurements representative of the formation fluid (block 414) and the characteristic of the formation fluid (e.g., one of pressure, composition, temperature). Similarly, a relationship between physical properties derived at least in part from NMR measurements (e.g. viscosity) and the characteristic of the formation fluid (e.g., one of pressure, composition, temperature) may be derived. For example, one or more of the coefficients in Equations 7, 8 or 9 may be determined.

In some cases, more than two NMR measurements associated with more than two different values of the characteristics of the formation fluid are needed to robustly determine the relationship. In this case, the operations described with respect to blocks 410 and 412 may be repeated any desired number of times. Additionally and/or alternatively, effecting the change in the characteristic of the formation fluid may include changing another characteristic of the formation fluid (e.g. changing the pressure of the formation fluid 44 in the chamber 60 in FIG. 6 instead of temperature). With a plurality of NMR measurements associated with a plurality of formation fluid characteristic values, one or more of the coefficients in Equations 7, 8 or 9 may be determined by curve fitting techniques.

The relationship (e.g., the viscosity versus temperature, the viscosity versus thermal energy provided to the formation) may then be analyzed or evaluated to determine a threshold (e.g. an amount of energy required to reduce the formation viscosity below a predetermined threshold) for sampling the formation fluid (block 416). Further, if the threshold for sampling has been attained, then the tool (e.g., a heating and/or sampling tool 100 in FIGS. 7 and 8) samples the formation fluid as further detailed below.

The relationship (e.g., the viscosity versus temperature, the viscosity versus pressure) may also be analyzed or evaluated to determine if a phase boundary has been crossed as the characteristic of the formation fluid has been changed (block 416). For example, an abrupt change of NMR measurements corresponding to a limited change of formation characteristic may indicate a phase transition (precipitation, ebullition). This analysis may be used for identifying points in a graph similar to the one shown in FIG. 5.

In another implementation of method 400, a downhole tool is lowered in the borehole, (block 402) and the tool is aligned with the formation to be characterized (block 404). The downhole tool is configured to make nearly-simultaneous NMR measurements at multiple radial distances from the borehole wall. For example, the NMR module of the downhole tool may be implemented with the MRScanner (trademark of Schlumberger Technology Corporation).

If desired, an optional NMR measurement on the formation fluid is obtained (block 408). At block 410, the downhole tool effects a radial gradient of a characteristic of the formation. For example, the borehole wall is heated by one of the means discussed elsewhere herein. The time- and power-dependence of temperature measurements at the borehole wall are adequate to determine the thermal diffusivity of the formation over the radial distance probed by the downhole tool, and a radial profile of temperature is thus readily determined (see for example Equations 10-18).

The tool makes nearly-simultaneous NMR measurements at multiple radial distances from the borehole wall at block 412. In particular, the tool obtains a first NMR measurement at a first selected radial distance from the borehole wall and a second NMR measurement at a second selected distance from the borehole wall.

At block 416, the oil viscosity and other physical properties of the formation and formation fluid can be determined from the NMR measurements as a function of depth of investigation. The determined properties may be combined with the radial profile of temperature determined at block 410 to determine a relationship between the determined properties and the temperature. Thus, by measuring the radial variation of NMR properties, a relationship between NMR measurements and the characteristic of the formation may be determined and used to advantage as described elsewhere therein. As mentioned before, the operations described with respect to blocks 410 and 412 may be repeated any number of times to improve the robustness of the relationship determined in block 414. Alternatively or additionally, the optional NMR measurement obtained in block 408 may be used for determining the relationship in block 414.

While this implementation has been described with a radial gradient of the formation characteristics, other gradient may be used. Accordingly, the NMR measurements in blocks 408 and/or 410 may be obtained at selected locations other than selected radial distance from the wellbore wall. For example, a plurality of NMR tools may be used in the same tool string, the NMR tools being located at different relative distances with respect to the heater.

Figure 11:
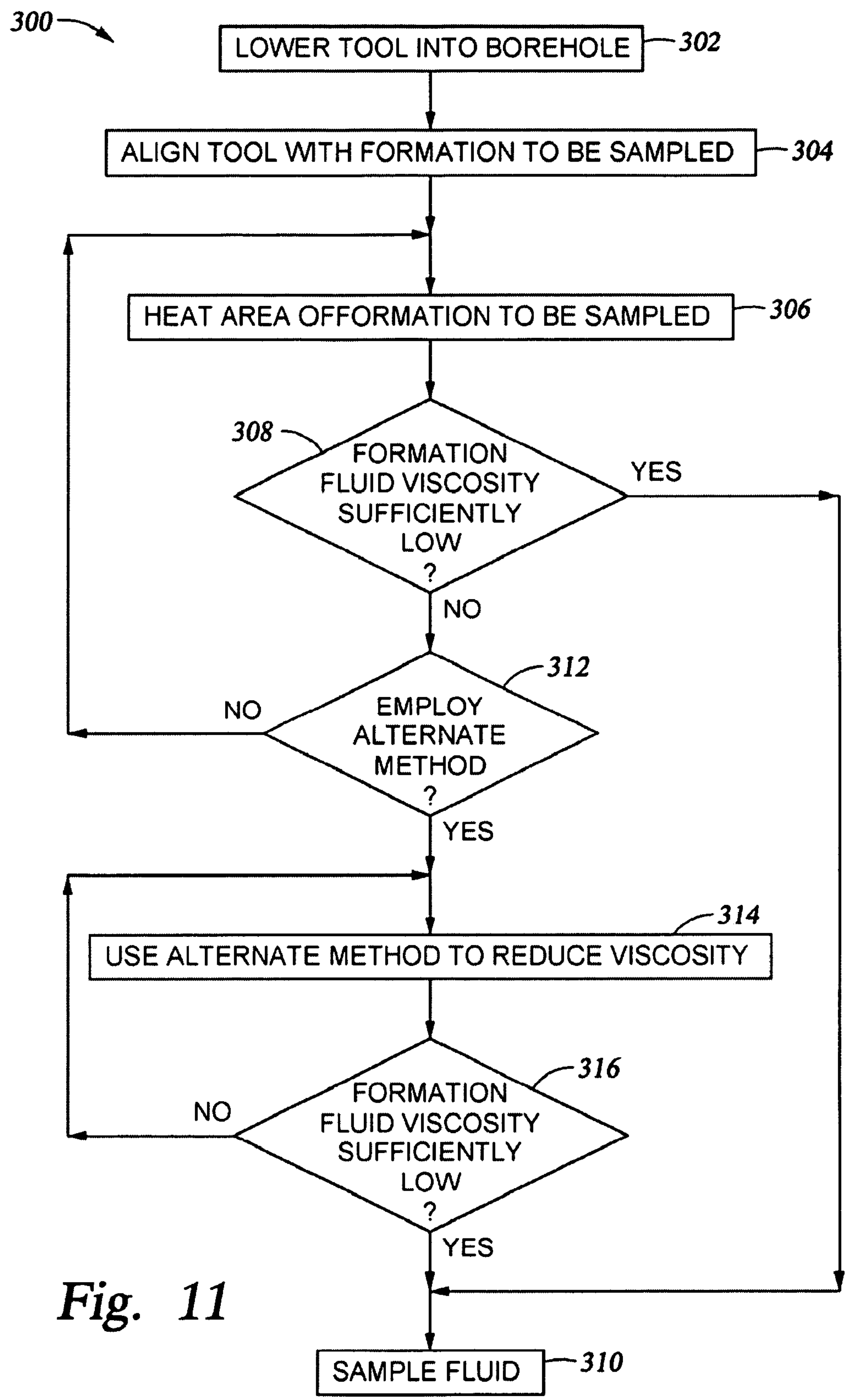
FIG. 11 is a flow chart representative of an example method to use an example apparatus to conduct NMR measurements of a downhole formation fluid during sampling of the formation.

FIG. 11 depicts an example method 300 that may be employed by the example apparatus described herein to measure the viscosity of a formation fluid during heating of the formation. As shown in the example of FIG. 11, a tool (e.g., a downhole tool 10 in FIG. 6 or a heating and/or sampling tool 100 in FIGS. 7 and 8) is lowered into a borehole (block 302) and is aligned with a formation (e.g., a formation F in FIG. 7) to be sampled (block 304). The formation is then heated (e.g., using the heating module 108 in FIG. 7) (block 306).

The example method 300 then determines if the formation fluid viscosity is sufficiently low to enable sampling of the formation fluid (block 308). For example, the NMR module 119 in FIG. 7 may be used to determine the viscosity of the formation fluid in the portion of the formation F being heated and which is to be sampled as described with respect to FIG. 10. If the formation fluid viscosity is sufficiently low to be sampled at block 308, the fluid is sampled (block 310).

On the other hand, if the formation fluid viscosity is not sufficiently low to be sampled at block 308, the example method 300 determines if an alternate method of reducing the viscosity of the formation fluid should be employed (block 312). For example, if heating the formation for some predetermined maximum time has not resulted in a reduction of the formation fluid viscosity to a sufficiently low value to enable proper sampling of the formation fluid, a solvent or other diluting agent may be injected into the formation (e.g., the probes 240 and 260 in the formation 210 in FIG. 9) to cause a further reduction in formation fluid viscosity. If at block 312 the method 300 determines that an alternate method of reducing the formation fluid viscosity is not to be employed, then control returns to block 306 and the formation (e.g., the formation F in FIG. 7) continues to be heated.

On the other hand, if the method 300 determines at block 312 that an alternate method (e.g., the injection of a dilutent or solvent via probes 240 and 260 in FIG. 9) should be employed to further reduce the formation fluid viscosity, then the example method 300 employs the alternate fluid viscosity reduction method (block 314). The method 300 then determines if the formation fluid viscosity is sufficiently low (e.g., the NMR module 298 in FIG. 9) to enable proper sampling (block 316). If the formation fluid viscosity is not sufficiently low at block 316, control returns to block 314 at which the alternate method of reducing formation fluid viscosity continues to be employed. On the other hand, if the formation fluid viscosity is sufficiently low at block 316 to enable proper sampling, then control passes to block 310 at which the formation fluid is sampled.

Thus, as described above, the example apparatus and methods described herein may employ an NMR module or equipment in a downhole tool (e.g., a heating and/or sampling tool) to monitor changes in formation fluid viscosity as the formation is heated and/or as a dilutent is injected into the formation. In this manner, the properties of the formation fluid can be evaluated during heating of the formation, for example, to determine when the viscosity of the formation fluid (e.g., a heavy oil) has been lowered sufficiently to be sampled by a formation sampling tool. In some implementations, formation fluid viscosity measurements may be used to control the time at which and/or temperature at which a formation is heated, and if alternative or additional methods (e.g., solvents, dilutents, etc.) should be employed to further reduce the viscosity of the formation fluid (e.g., if heating the formation alone is found to be ineffective).

Additionally or alternatively, the use of an NMR module to determine the viscosity of a formation fluid being heated may enable improved estimates of thermal capacity of the formation and the heating time needed to reach a target or desire formation fluid viscosity. For example, with NMR measurements having a limited depth of investigation into the formation, knowledge of the viscosity variation with temperature combined with a database of these variations for reservoir fluids as a function of applied heater time and power may be used to determine an estimate of the formation thermal diffusivity which, in turn, could be used as an input parameter to calculate when sufficient time had been allotted for heating.

Example methods and apparatus for monitoring a property of a formation fluid are described with reference to the flowcharts illustrated in FIGS. 10 and 11. However, persons of ordinary skill in the art will readily appreciate that other methods of implementing the example methods may alternatively be used. For example, the order of execution of the blocks may be change, eliminated, or combined.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:

acquiring, in a downhole tool disposed in a borehole penetrating a subterranean formation, a sample of formation fluid from the formation;

obtaining a first NMR measurement on the formation fluid sample using the downhole tool while the sample is in the downhole tool;

effecting a change in a characteristic of the formation fluid sample while the sample is in the downhole tool;

determining the change in the characteristic of the formation fluid sample using the downhole tool;

obtaining, subsequent to effecting and determining the change, a second NMR measurement on the formation fluid sample using the downhole tool while the sample is in the downhole tool; and using the first and second NMR measurements and the formation fluid sample characteristic to determine a relationship between NMR measurements and the characteristic of the formation fluid sample.

2. The method as claimed in claim 1, wherein effecting the change in the characteristic of the formation fluid sample includes at least one of effecting a change in a pressure, a composition, or a temperature of the formation fluid sample.

3. The method as claimed in claim 1, wherein using the first and second NMR measurements further includes determining a viscosity of the formation fluid sample.

4. The method as claimed in claim 1, wherein using the first and second NMR measurements further includes determining a value indicative of a thermal diffusivity of the formation.

5. The method as claimed in claim 1, wherein using the first and second NMR measurements includes determining a phase transition of the formation fluid sample.

6. The method as claimed in claim 1, wherein effecting the change in the characteristic of the formation fluid sample includes adding a solvent to the formation fluid sample.

7. The method as claimed in claim 1, further including effecting a change in another characteristic of the formation fluid sample while the sample is in the downhole tool.

8. A method comprising:

acquiring, in a downhole tool disposed in a borehole penetrating a subterranean formation, a sample of formation fluid from the formation;

obtaining a first NMR measurement of the formation fluid sample using the downhole tool while the sample is in the downhole tool;

using the first NMR measurement to determine a first viscosity value of the formation fluid sample in the downhole tool;

providing heat energy to the formation fluid sample in the downhole tool;

obtaining a second NMR measurement of the formation fluid sample using the downhole tool while the sample is in the downhole tool;

using the second NMR measurement to determine a second viscosity value of the formation fluid sample in the downhole tool; and determining a relationship between a value indicative of an amount of energy provided to the formation fluid sample and viscosity of fluid in the formation based on at least the first and second viscosity values.

9. The method as claimed in claim 8, further comprising determining at least one of a value indicative of a thermal diffusivity and a value indicative of a thermal capacity of the subterranean formation.

10. The method as claimed in claim 8, further comprising:

determining an amount of energy required to reduce the viscosity of the fluid in the formation below a predetermined threshold; and determining a threshold at which the fluid in the formation may be sampled.

11. The method as claimed in claim 8, further comprising determining a phase change boundary of the formation fluid sample.

12. An apparatus for determining a parameter of a formation fluid, the apparatus configured for disposition in a borehole penetrating a subterranean formation, the apparatus comprising:

a tool configured to be positioned in a borehole penetrating a subterranean formation, and further configured to make NMR measurements of a fluid sample obtained from the formation while the fluid sample is in the tool;

a heating element configured to change a temperature associated with the formation fluid sample in the tool; and a controller coupled operatively with the tool and the heating element, wherein the controller is configured to determine a relationship between an amount of energy associated with changing the temperature of the formation fluid sample and a viscosity of the formation fluid sample.

13. The apparatus as claimed in claim 12, further comprising an inlet hydraulically coupled to a flow line, wherein the tool is configured to make the NMR measuremens of the formation fluid sample while the formation fluid sample is disposed in the flow litne.

14. The apparatus as claimed in to claim 12, further comprising a sampling tool configured to capture at least a portion of the formation fluid sample.

15. The apparatus as claimed in claim 12, further comprising a temperature sensor configured to measure the temperature of the formation fluid sample.

16. The apparatus as claimed in claim 12, further comprising a piston coupled to an actuator and configured to vary a pressure of the formation fluid sample within the tool.

17. A method to characterize a subterranean formation with a tool disposed in a borehole penetrating the subterranean formation, the method comprising:

effecting a radial gradient of a characteristic of the formation;

obtaining a first NMR measurement at a first selected location in the formation;

obtaining a second NMR measurement at a second selected location in the formation, wherein at least one of the first selected location and the second selected location is located radially outward of a wall of the borehole; and using the first and second NMR measurements and the radial gradient of the characteristic to determine a relationship between NMR measurements and the characteristic of the formation.

* * * * *